(12) United States Patent
Ma et al.

(10) Patent No.: US 11,840,472 B2
(45) Date of Patent: Dec. 12, 2023

(54) ELONGATION METHOD AND PREFORM FOR PRODUCING AN OPTICAL GLASS COMPONENT

(71) Applicant: HERAEUS QUARTZ NORTH AMERICA LLC, Buford, GA (US)

(72) Inventors: Qiulin Ma, Alpharetta, GA (US); Kai Huei Chang, Decatur, GA (US); Evan P. Green, Lawrenceville, GA (US)

(73) Assignee: HERAEUS QUARTZ NORTH AMERICA LLC, Buford, GA (US)

( * ) Notice: Subject to any disclaimer, the term of this patent is extended or adjusted under 35 U.S.C. 154(b) by 382 days.

(21) Appl. No.: 17/152,518

(22) Filed: Jan. 19, 2021

(65) Prior Publication Data

US 2021/0130221 A1 May 6, 2021

Related U.S. Application Data

(62) Division of application No. 15/497,316, filed on Apr. 26, 2017, now Pat. No. 11,618,708.
(Continued)

(51) Int. Cl.
*C03B 37/025* (2006.01)
*C03B 37/012* (2006.01)

(52) U.S. Cl.
CPC ...... *C03B 37/025* (2013.01); *C03B 37/01205* (2013.01); *C03B 37/01225* (2013.01); *C03B 2205/13* (2013.01); *Y02P 40/57* (2015.11)

(58) Field of Classification Search
None
See application file for complete search history.

(56) References Cited

U.S. PATENT DOCUMENTS 5,785,729 A 7/1998 Yokokawa et al.
6,532,776 B1 3/2003 Suzuki et al.
(Continued)

FOREIGN PATENT DOCUMENTS

CN 1199026 A 11/1998
CN 103739193 A 4/2014
(Continued)

OTHER PUBLICATIONS

JP-3714571-B2 Machine Translation Performed by Clarivate Analytics Mar. 31, 2023. (Year: 2023).*
(Continued)

*Primary Examiner* — Lisa L Herring
(74) *Attorney, Agent, or Firm* — Panitch Schwarze Belisario & Nadel LLP

(57) ABSTRACT

Method of producing glass components and preforms for use in the method. The preform includes a primary rod having a constant outside diameter and a flat bottom portion, wherein the primary rod comprises a core rod surrounded by at least one outer cladding layer; and a cylindrical sacrificial tip having a first end attached to the flat bottom portion of the primary rod, a second end opposite the first end, and a hollow interior region extending fully from the first end to the second end, wherein the sacrificial tip is circular in cross section and the first end of the sacrificial tip has a constant inside diameter and outside diameter along its entire length from the first end to the second end, and wherein the constant outside diameter is equal to the outside diameter of the primary rod. When the preform is heated in a furnace, the sacrificial tip melts and collapses into a drawing bulb which either draws the primary rod directly into the glass fiber or results in a tapered (i.e. tipped) preform for subsequent fiber draw. Material waste as well as the drip time is reduced and the cladding-to-core ratio, crucial for waveguide properties, (Continued)

is maintained for the whole preform compared to a square cut preform without the sacrificial tip.

14 Claims, 20 Drawing Sheets

Related U.S. Application Data

(60) Provisional application No. 62/330,995, filed on May 3, 2016.

(56) References Cited

U.S. PATENT DOCUMENTS

| | | | |
|---|---|---|---|
| 6,649,261 | B2 | 11/2003 | Jensen et al. |
| 6,779,363 | B1 | 8/2004 | Craft et al. |
| 7,681,416 | B2 | 3/2010 | Ganz et al. |
| 8,015,846 | B2 | 9/2011 | Peekhaus et al. |
| 2001/0023598 | A1 * | 9/2001 | Kohmura .......... C03B 37/01251 65/513 |
| 2003/0024273 | A1 | 2/2003 | Ishihara |
| 2004/0206128 | A1 | 10/2004 | Zilnyk |
| 2004/0237592 | A1 | 12/2004 | Iguchi et al. |
| 2007/0147748 | A1 | 6/2007 | Kume et al. |
| 2007/0245773 | A1 | 10/2007 | Peekhaus et al. |
| 2013/0061637 | A1 | 3/2013 | Okada |
| 2015/0218031 | A1 | 8/2015 | Otosaka |
| 2016/0185646 | A1 | 6/2016 | Otosaka |

FOREIGN PATENT DOCUMENTS

| | | |
|---|---|---|
| EP | 1165451 B1 | 9/2003 |
| EP | 1328481 B1 | 8/2007 |
| IN | 4151/DEL/2015 | 8/2016 |
| JP | S53123939 | 10/1978 |
| JP | S5614441 A | 2/1981 |
| JP | S61251536 A | 11/1986 |
| JP | S63-170235 | 7/1988 |
| JP | H07330362 A | 12/1995 |
| JP | H08310825 A | 11/1996 |
| JP | 10130032 A * | 5/1998 .......... C03B 37/029 |
| JP | H10182179 | 7/1998 |
| JP | 2000-327358 | 11/2000 |
| JP | 2001-039721 | 2/2001 |
| JP | 2002080238 A | 3/2002 |
| JP | 2005145796 | 6/2005 |
| JP | 2005250025 | 9/2005 |
| JP | 3714571 B2 * | 11/2005 ....... C03B 37/01211 |
| JP | 2015202975 | 11/2015 |
| WO | 2011145648 | 11/2011 |
| WO | 2016/024965 A1 | 2/2016 |

OTHER PUBLICATIONS

JP-10130032-A Machine Translation Performed by Clarivate Analytics Mar. 31, 2023. (Year: 2023).*

Extended European Search Report dated Oct. 13, 2017 by the European Patent Office in connection with counterpart European Patent Application No. 17168145.5.

First Examination Report dated Mar. 9, 2021 by the Indian Patent Office for counterpart Indian Patent Application No. 201744014727.

Notice of Pre-Grant Opposition dated Mar. 9, 2021 by the Indian Patent Office for counterpart Indian Patent Application No. 201744014727.

Office Action (with English Translation attached) dated Mar. 8, 2021 by the Japanese Patent Office for counterpart Japanese Patent Application No. 2017-087315.

Office action (including search report) dated May 19, 2021 by the China National Intellectual Property Administration for counterpart Chinese Patent Application No. 201710285034.3 (with English translation).

* cited by examiner

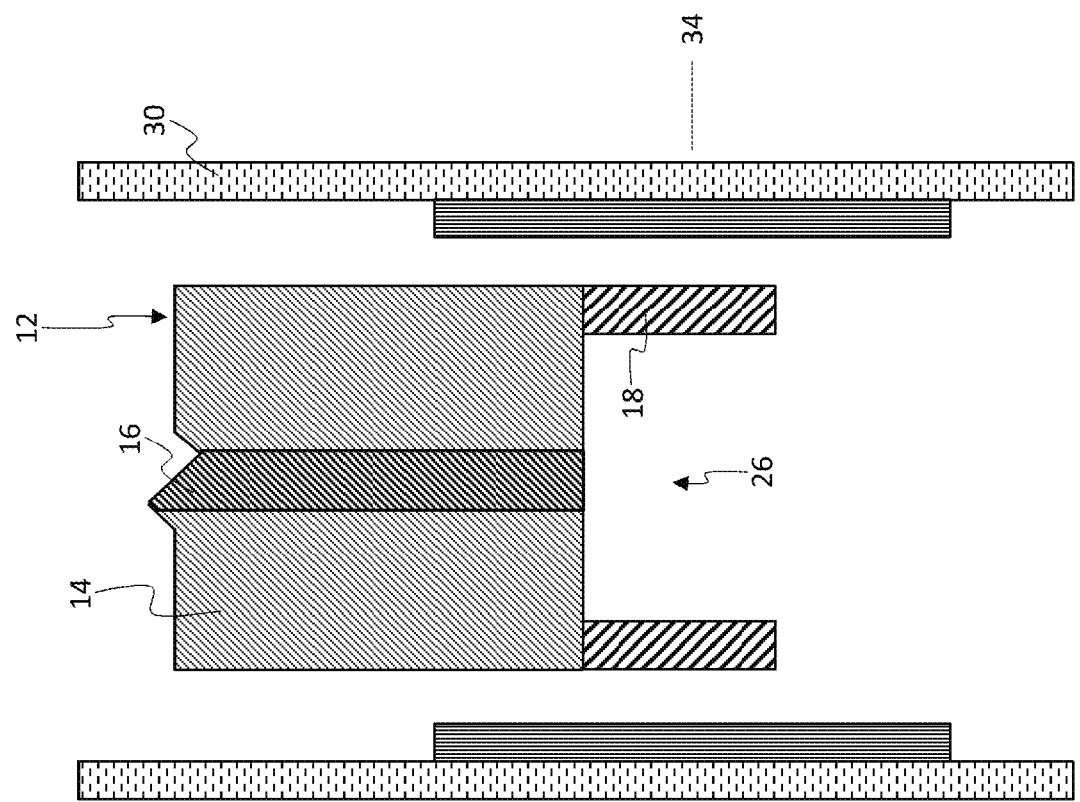

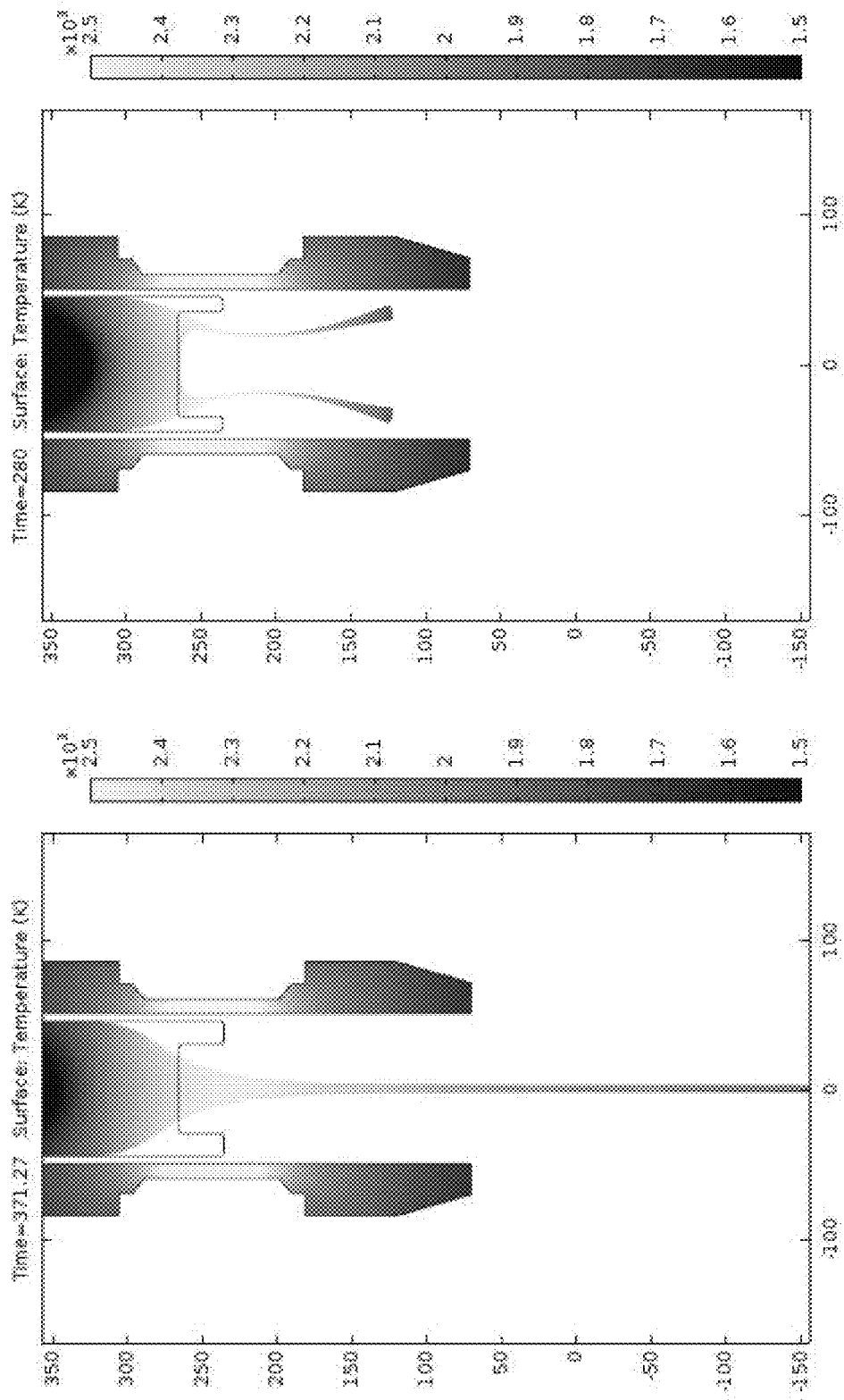

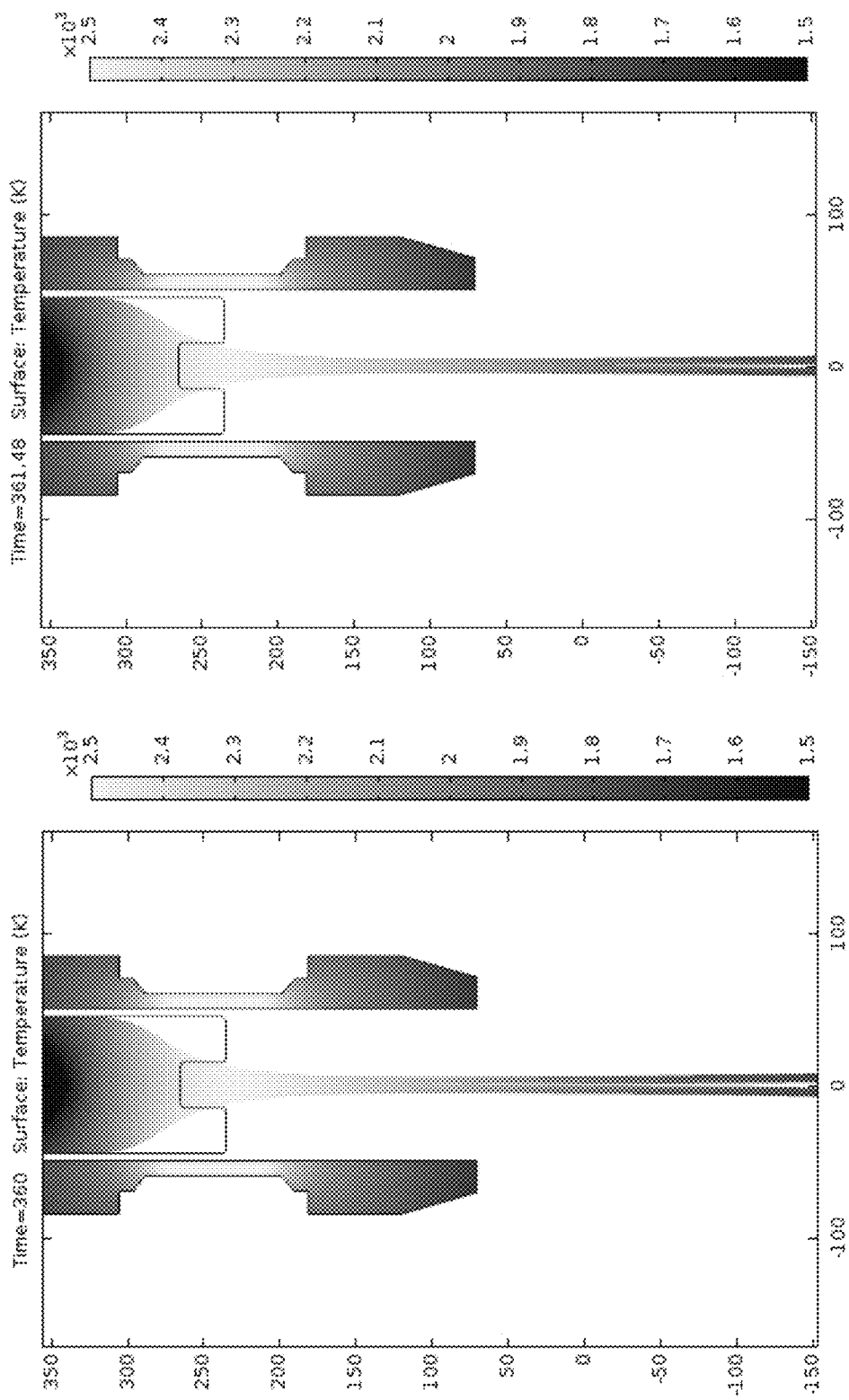

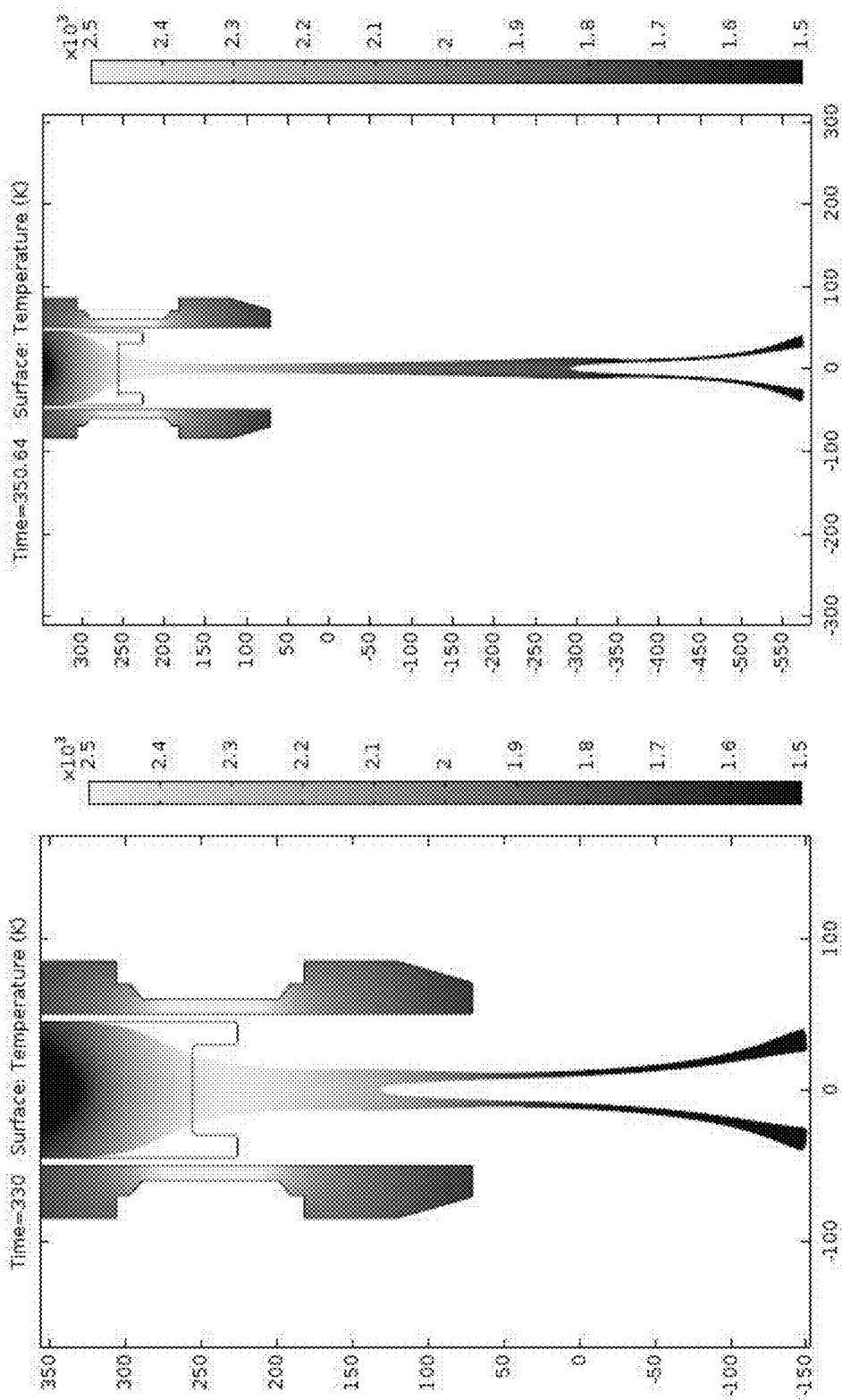

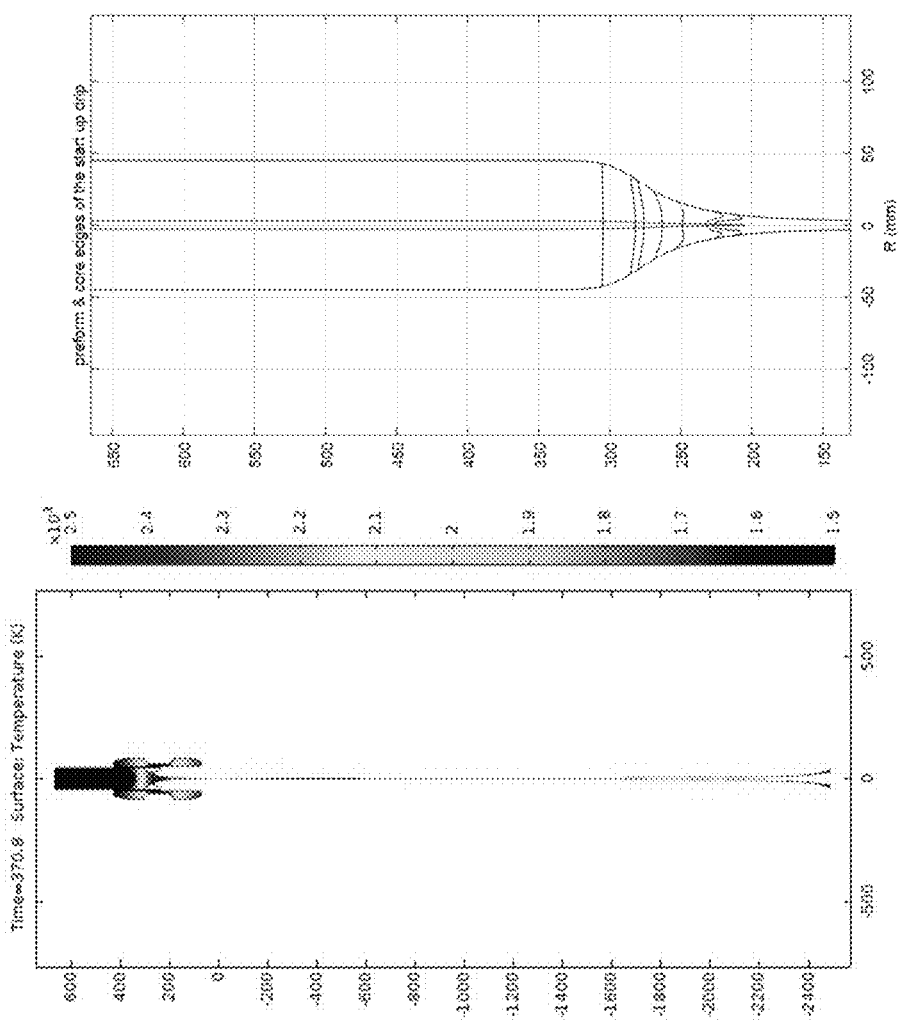
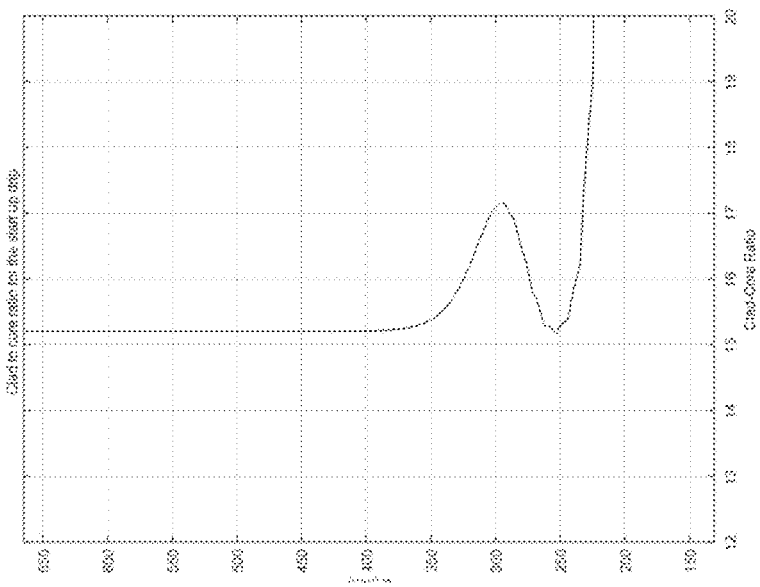
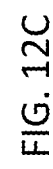
FIG. 12C
FIG. 12B
FIG. 12A

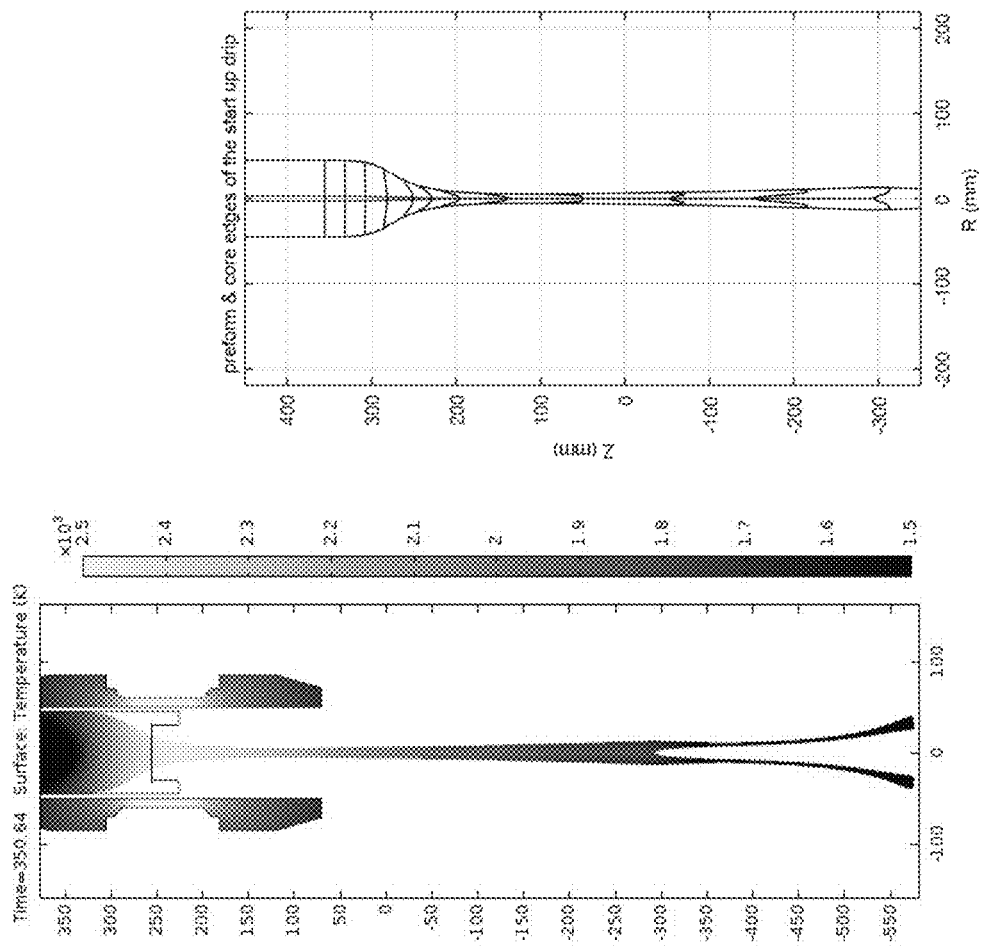
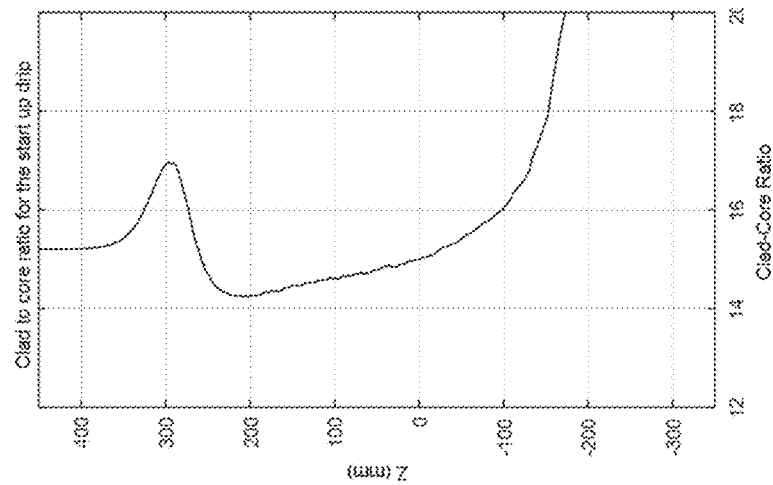
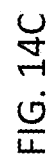
FIG. 14C
FIG. 14B
FIG. 14A

ELONGATION METHOD AND PREFORM FOR PRODUCING AN OPTICAL GLASS COMPONENT

CROSS-REFERENCE TO RELATED APPLICATION

This application is a divisional application of U.S. application Ser. No. 15/497,316, which claims the benefit of priority under 35 U.S.C. § 119(e) to earlier filed U.S. provisional patent Application No. 62/330,995 filed May 3, 2016, the disclosures of which are herein incorporated by reference.

TECHNICAL FIELD

The disclosure relates to an elongation method for producing an optical component of quartz glass, and particularly to a preliminary product, or preform, having a hollow sacrificial tip as well as a method for producing an optical component by elongating a preliminary article, or preform, having a hollow sacrificial tip. The optical component so produced can be an optical fiber or a tipped preform for subsequent fiber draw.

BACKGROUND

Optical fibers are waveguides that can transmit light, with minimal scattering and attenuation, between two locations. Optical fibers, and the associated fiber optics, are well known and used in applications such as, illumination, communications, information transfer, and sensors. Optical fibers are typically flexible and very thin, and have a transparent core surrounded by one or more transparent cladding layers. The core and the cladding layers are made of vitreous material, such as high-quality glass (made from, for example, silica, fluoride, phosphates, etc.). Typically, the core material has a refractive index which is greater than the refractive index of the cladding material. These conditions enable internal reflection of light signals passing through the fiber, resulting in an efficient waveguide.

Optical fibers are generally manufactured by drawing the fiber from a preliminary article, also known as a preform, which is heated in a vertically oriented furnace with a radial heating element. The preform includes the core material and the cladding layers as described above in essentially the same cladding-to-core ratio and refractive index profile as the desired optical fiber product. When the preform is heated in the furnace, a drawing bulb or glass drop forms at the lower softened end of the preform. The component can then be drawn off from the softened end of the preform with a given geometry and desired dimensions. Importantly, the drawn fiber must maintain the ratio between the diameter of the core material and the diameter of the cladding layers which exist in the initial preform in order to have the correct waveguide properties. With a square cut preform, however, material waste can occur due to at least two causes. First, the formation of the drawing bulb results in a substantial waste of good preform material because the drawing bulb or the glass drop itself does not yield optical fiber. Second, as the preform end is heated radially, the temperature distribution, and therefore the viscosity of the preform, is highly non-uniform and it is very difficult to prevent differential glass flow between the core material and the cladding layers. As a result, the cladding-to-core ratio may be distorted at the start of the preform tipping or fiber draw, resulting in unusable fiber there. Distortion in the cladding-to-core ratio negatively affects many waveguide properties of the fiber, such as cutoff wavelength, mode field diameter, dispersion, and core eccentricity. Accordingly, it is desirable to modify the square-cut preform in a way that causes the drawing bulb to form with less material waste and waveguide distortion.

One method of modifying the preform is tapering the end of the preform by machining or flame tipping. Machining a taper into the preform end, however, can destroy the correct cladding-to-core ratio, resulting in fiber failures in cutoff wavelength and other optical properties. Flame or furnace tipping on square cut preforms also wastes a significant amount of good preform material and cause waveguide distortion.

Other methods of modifying the preform, such as that disclosed in U.S. Patent Publication No. 2007/0245773 by Peekhaus et al., include attaching a cone-shaped piece to the machined and tapered end of the preform, such that the drawing bulb is formed from both the cone-shaped piece and the machined taper of the good preform material. However, the method disclosed in Peekhaus requires the preform to be machined to a taper prior to fiber draw, which increases the complexity and cost of the process as well as the waste of good preform material for the reasons described above.

SUMMARY

Embodiments of the disclosure include a method of forming an optical glass component, the method comprising: positioning a glass preform in a furnace, wherein the glass preform comprises: a primary rod having a constant outside diameter and a flat bottom portion, wherein the primary rod comprises a core rod surrounded by at least one outer cladding layer; and a cylindrical sacrificial tip having a first end attached to the flat bottom portion of the primary rod, a second end opposite the first end, and a hollow interior region extending fully from the first end to the second end, wherein the sacrificial tip is circular in cross section and the first end of the sacrificial tip has a constant inside diameter and outside diameter along its entire length from the first end to the second end, and wherein the constant outside diameter is equal to the outside diameter of the primary rod; and heating the glass preform in the furnace to soften the sacrificial tip, whereby a drip forms at a bottom end of the preform and the drip pulls down on and elongates the unelongated primary rod to form an elongated primary rod. The primary rod and the sacrificial tip may both made of quartz glass, and the quartz glass of the primary rod may be of higher quality than the quartz glass of the sacrificial tip. The sacrificial tip may have a constant outside diameter equal to the outside diameter of the primary rod. The hollow interior region may have an inside diameter ranging from approximately 50% to approximately 80% of the outside diameter of the sacrificial tip. The sacrificial tip may have a length of approximately 10 mm to approximately 60 mm, preferably approximately 20 mm to approximately 50 mm, and most preferably approximately 25 mm to approximately 35 mm. The sacrificial tip may be welded to the primary rod. The primary rod may include a core rod surrounded by an outer cladding layer. The glass preform may be preheated at a height above the center of the furnace prior to positioning the glass preform in the furnace at an optimized location within the furnace. Preheating the glass preform outside of the furnace may include heating the furnace at a low power; positioning the glass preform at a first location above the center of the furnace at low power for a first period of time; raising the power of the furnace to a high operating power of the furnace; and lowering the preform into the furnace to an optimized hanging location above the center of the furnace. Lowering the preform into the oven to the optimized hanging location may include lowering the preform into the oven from the first location to a second location above the optimized hanging location; holding the preform at the second location for a period of time; and lowering the preform into the oven from the second location to the optimized hanging location. The drip formed at a bottom end of the preform may include substantially only material from the sacrificial tip and not material from the primary rod. The primary rod comprises a core rod surrounded by an outer cladding layer having a constant cladding-to-core ratio. Due to the gravitational force acting on the glass at different radial positions with different temperatures and viscosities, the drip pulling down on and elongates the primary rod may pull on an outside portion of the cladding layer without pulling on the core rod, resulting in reduced differential clad and core glass flow and waveguide distortion. The elongated primary rod may have a cladding-to-core ratio which is substantially the same as the cladding-to-core ratio of the unelongated primary rod.

BRIEF DESCRIPTION OF DRAWINGS

The disclosure is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 2 is a cross sectional view of the preform of FIG. 1A positioned in a furnace;

FIGS. 3A-3E are cross sectional views of a preform positioned in a furnace including a primary rod and a hollow cylindrical sacrificial tip with optimized tip dimensions and furnace position;

FIGS. 4A-4C are cross sectional views of a preform positioned in a furnace including a primary rod and a hollow cylindrical sacrificial tip with a sacrificial tip which has a wall which is too thin;

FIGS. 5A-5D are cross sectional views of a preform positioned in a furnace including a primary rod and a hollow cylindrical sacrificial tip with a sacrificial tip which has a wall which is too thick;

FIGS. 8A-8C are cross sectional views of a preform positioned in a furnace including a primary rod and a hollow cylindrical sacrificial tip with a sacrificial tip which is positioned too high in the furnace;

FIGS. 9A-9C are cross sectional views of a preform positioned in a furnace including a primary rod and a hollow cylindrical sacrificial tip with a sacrificial tip which is positioned too low in the furnace;

FIGS. 12A-12C depict the position, geometry, temperature, and cladding-to-core ratio of a preform with a sacrificial tip after a tapered tube has formed at the bottom of the preform;

FIGS. 14A-14C depict the position, geometry, temperature, and cladding-to-core ratio of a preform with a sacrificial tip positioned below an optimized location after a tapered tube has formed at the bottom of the preform.

DETAILED DESCRIPTION

Embodiments include a preform for fabricating a glass fiber. The preform includes a sacrificial tip welded to a primary rod made of high-quality material. When the preform is heated in a furnace, the sacrificial tip softens (i.e. the viscosity decreases) and collapses into a tapered tube which draws the primary rod into the glass fiber or results in a tipped preform. Embodiments of also include methods of using the preform to form the glass fiber or a tipped preform. Exemplary embodiments will now be described in conjunction with FIGS. 1A, 1B, and 2.

Figure 1B:
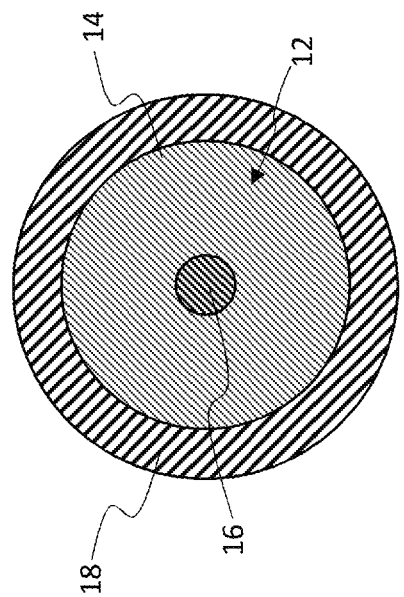
FIG. 1B is a bottom view of the preform of FIG. 1A.
Figure 1A:
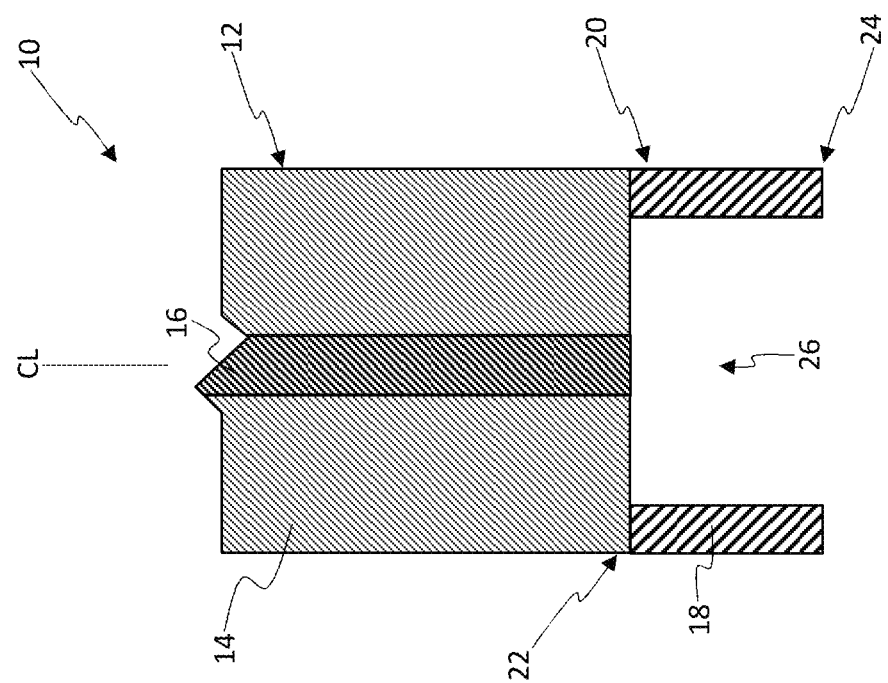
FIG. 1A is a cross sectional view of a preform including a primary rod and a sacrificial tip.
Figures 3A, 3B:
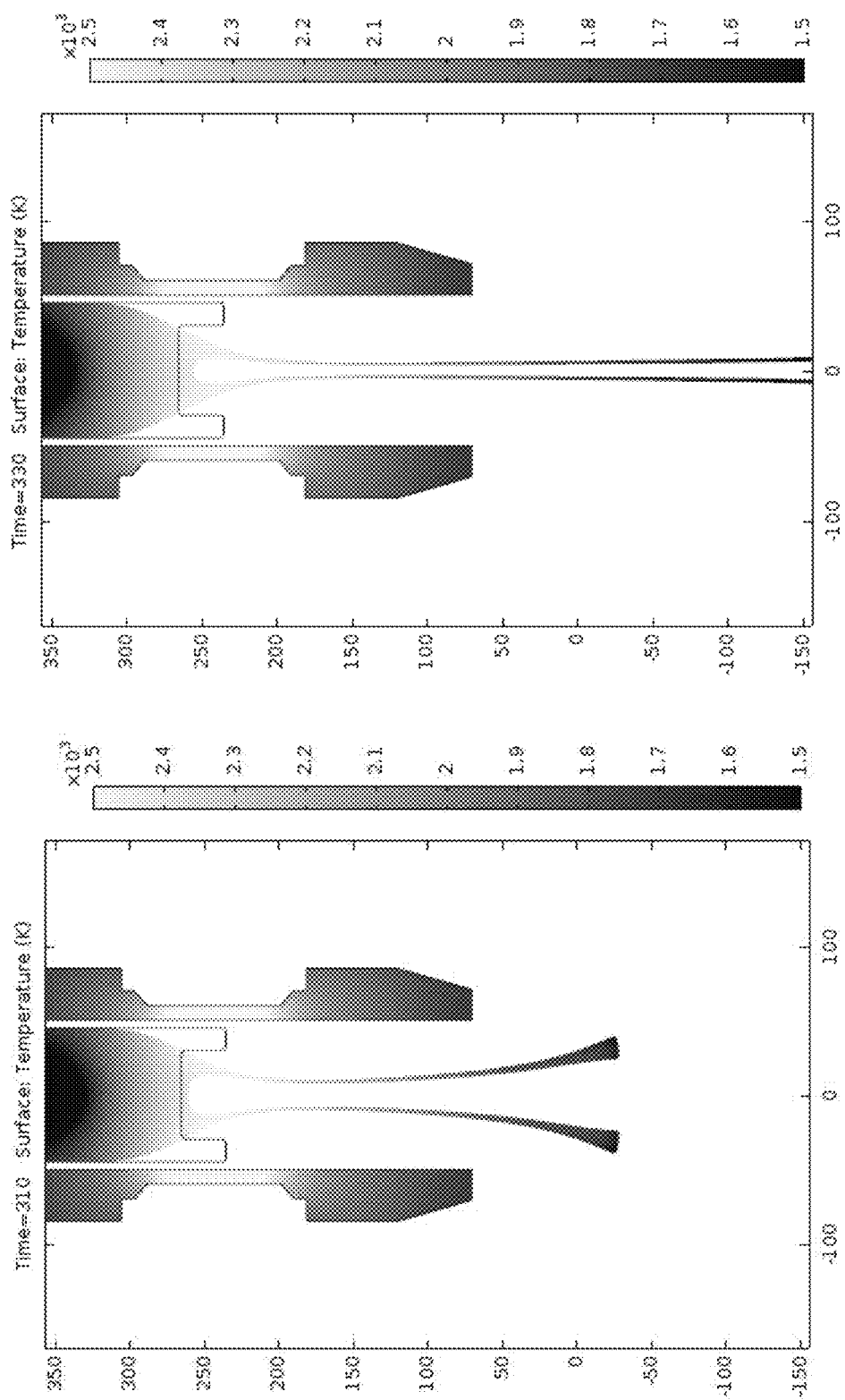
Figures 3C, 3D:
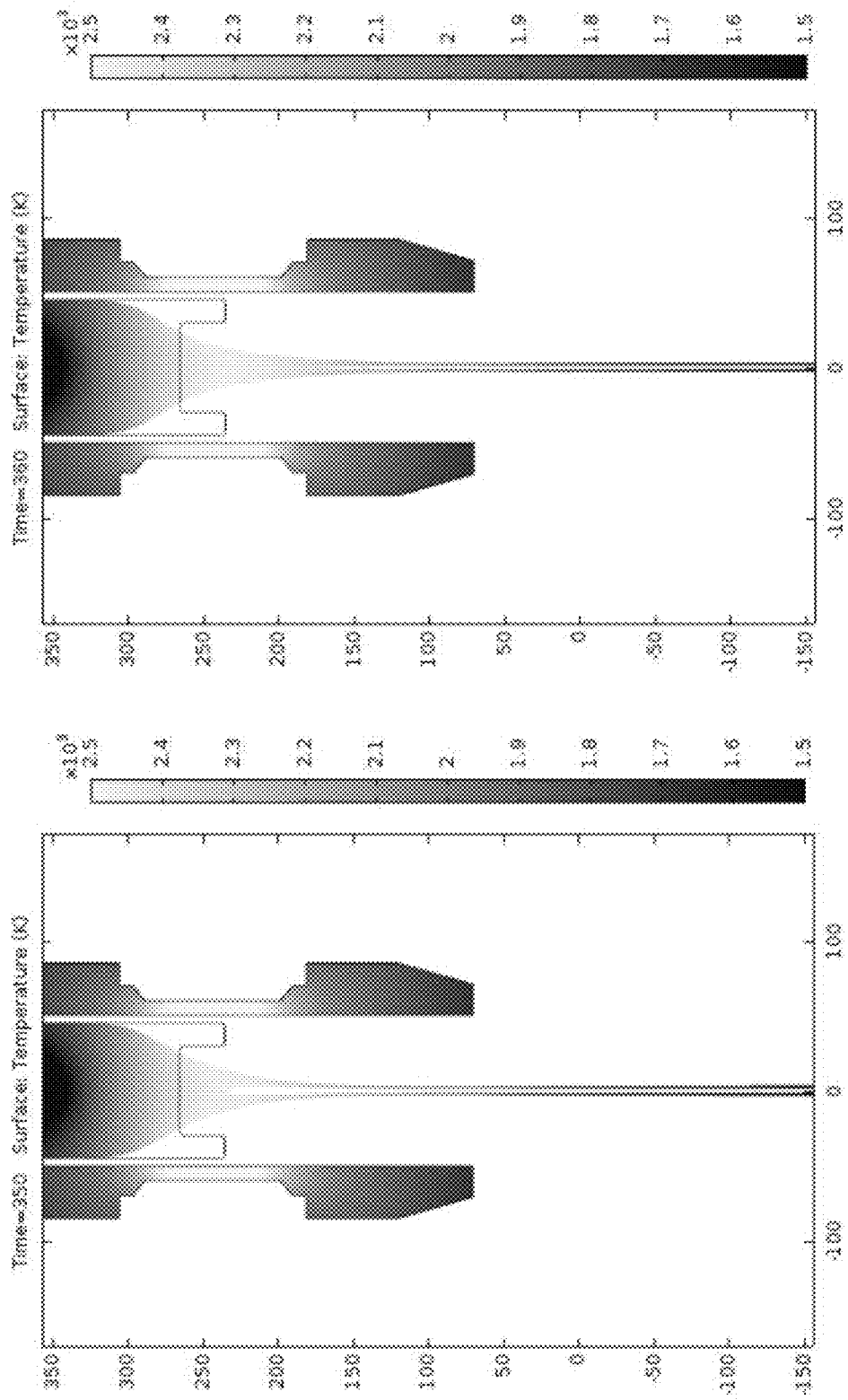
Figures 4B, 4C:
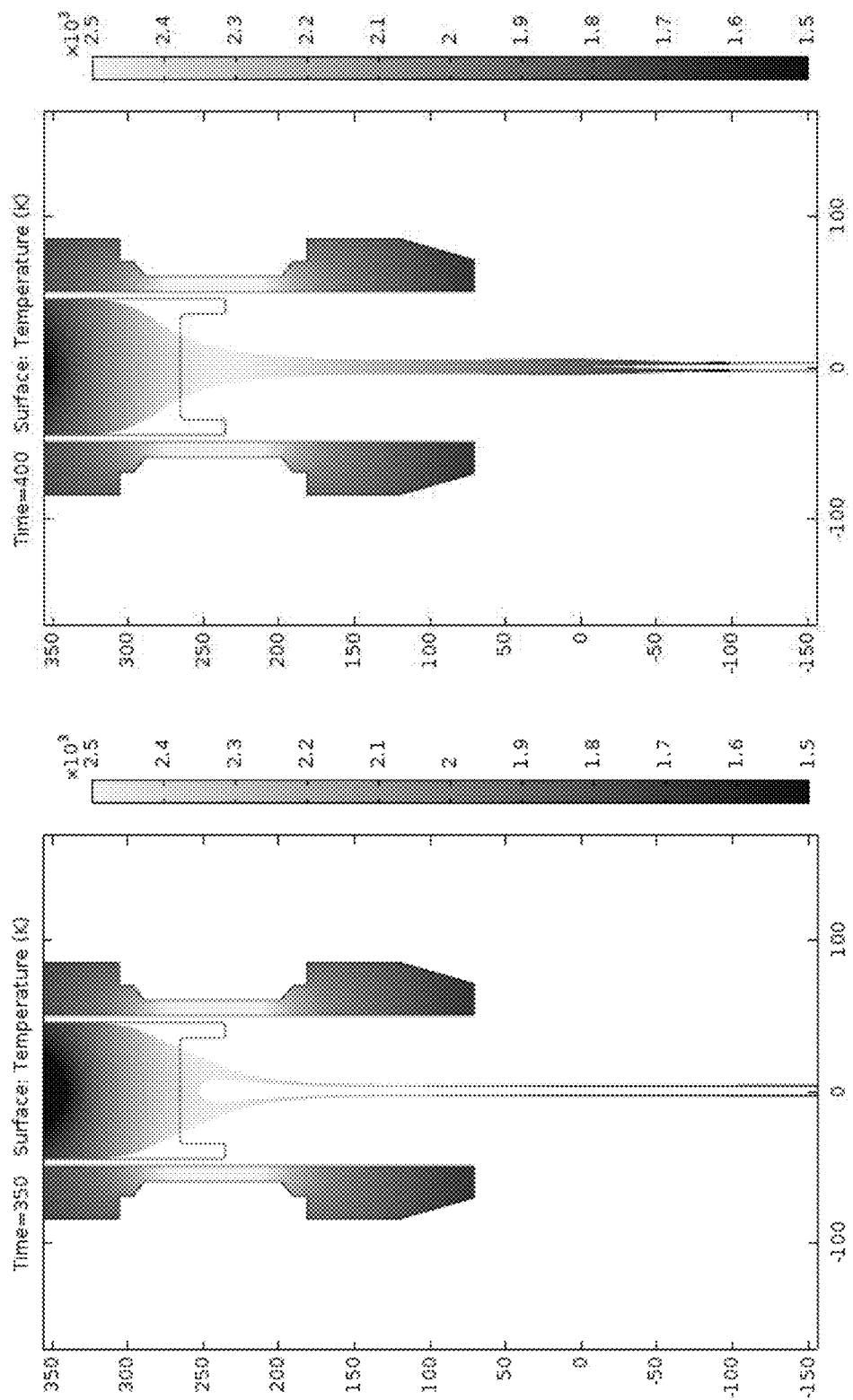
Figures 5A, 5B:
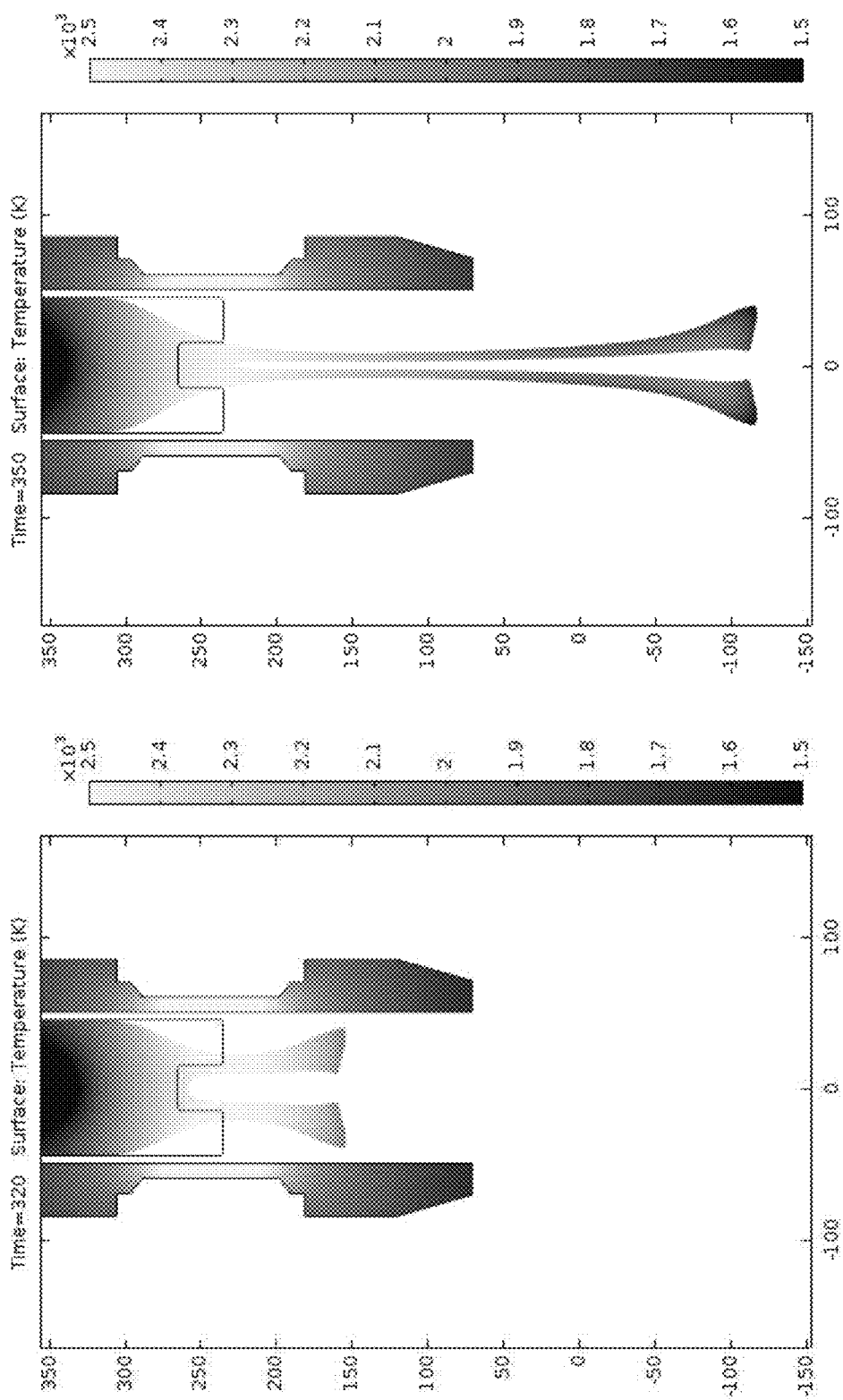
Figures 6A, 6B:
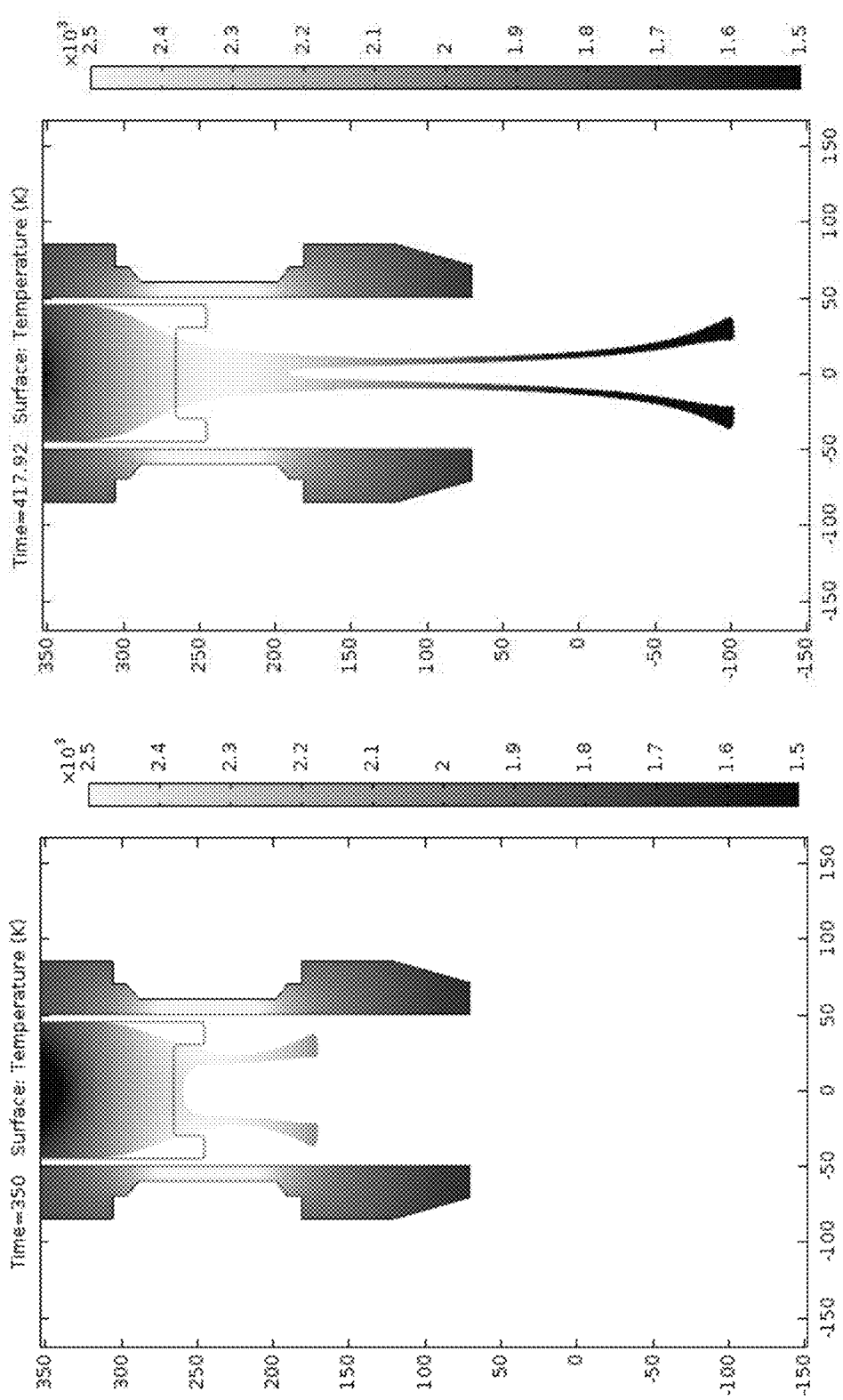
FIGS. 6A-6C are cross sectional views of a preform positioned in a furnace including a primary rod and a hollow cylindrical sacrificial tip with a sacrificial tip which is too short.
Figures 6C, 7A:
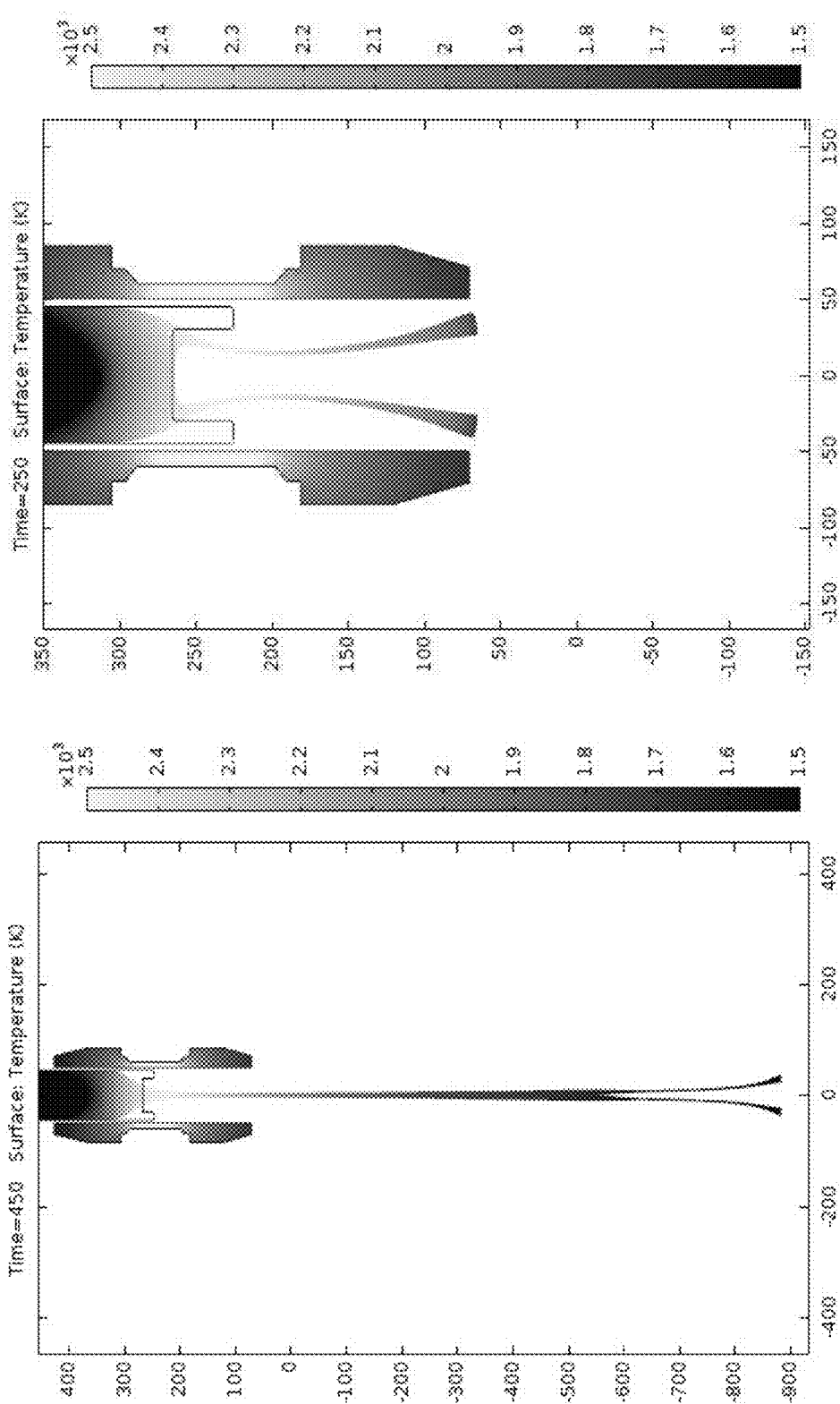
FIGS. 7A-7C are cross sectional views of a preform positioned in a furnace including a primary rod and a hollow cylindrical sacrificial tip with a sacrificial tip which is too long.
Figures 7B, 7C:
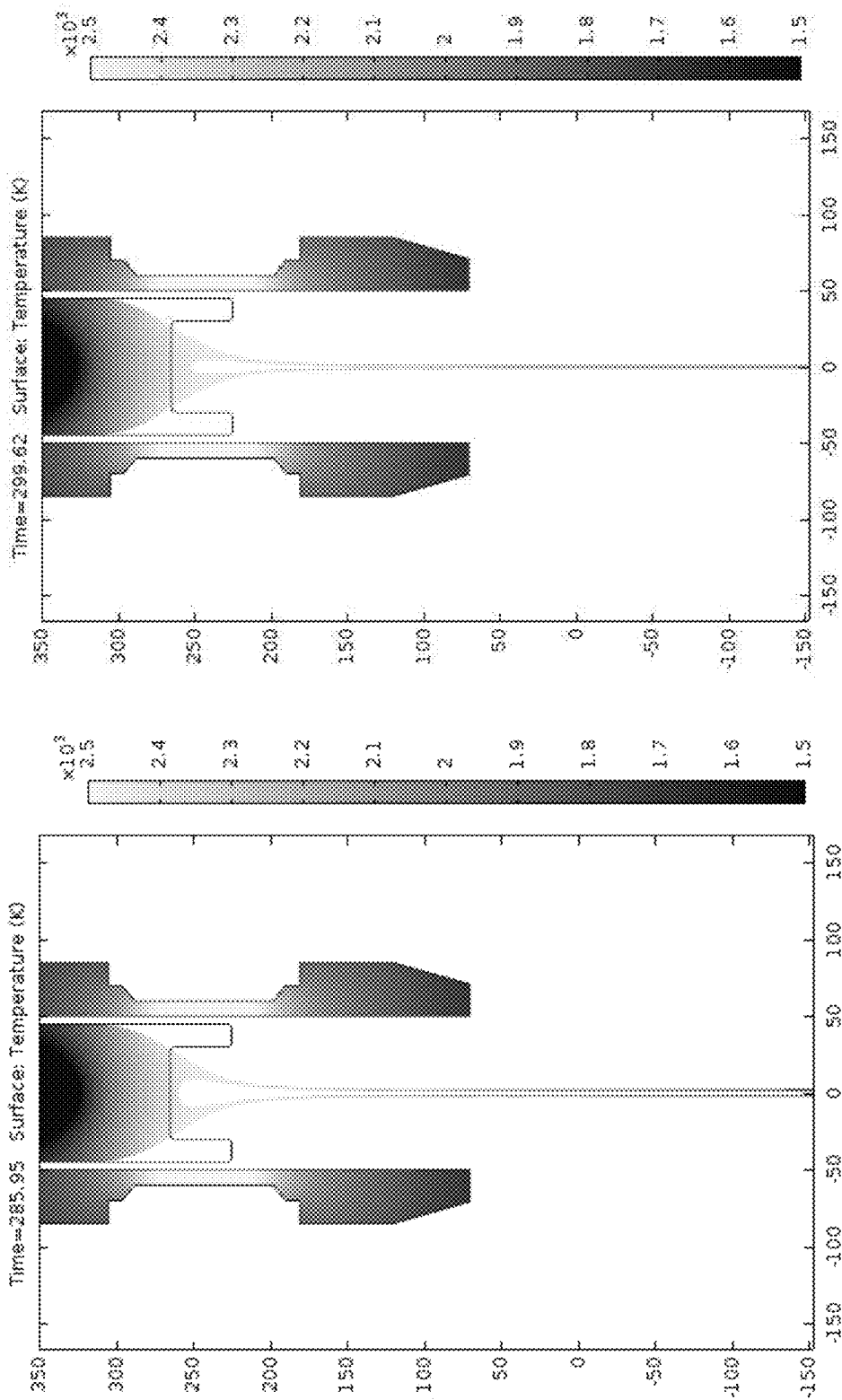
Figures 8A, 8B:
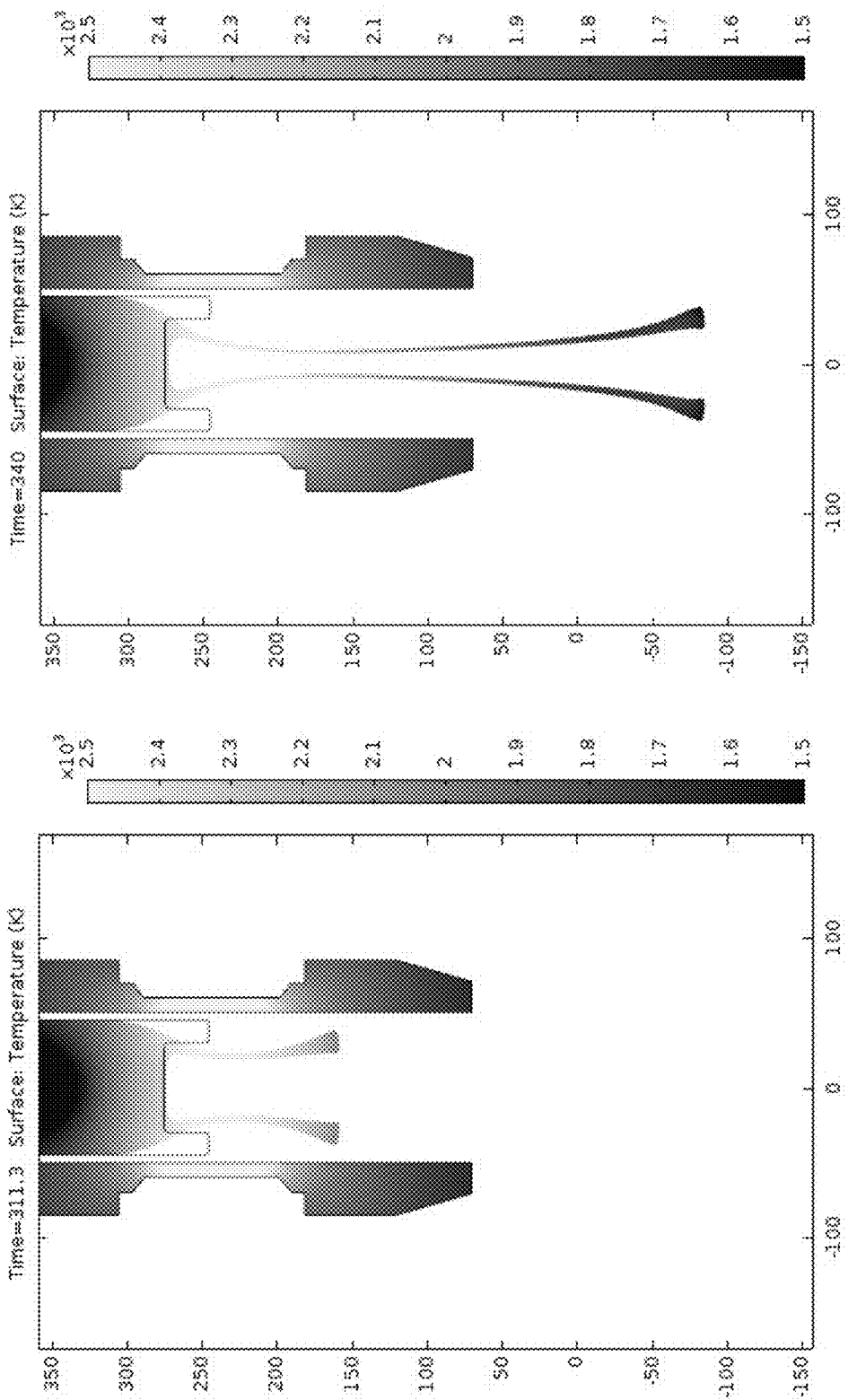
Figures 8C, 9A:
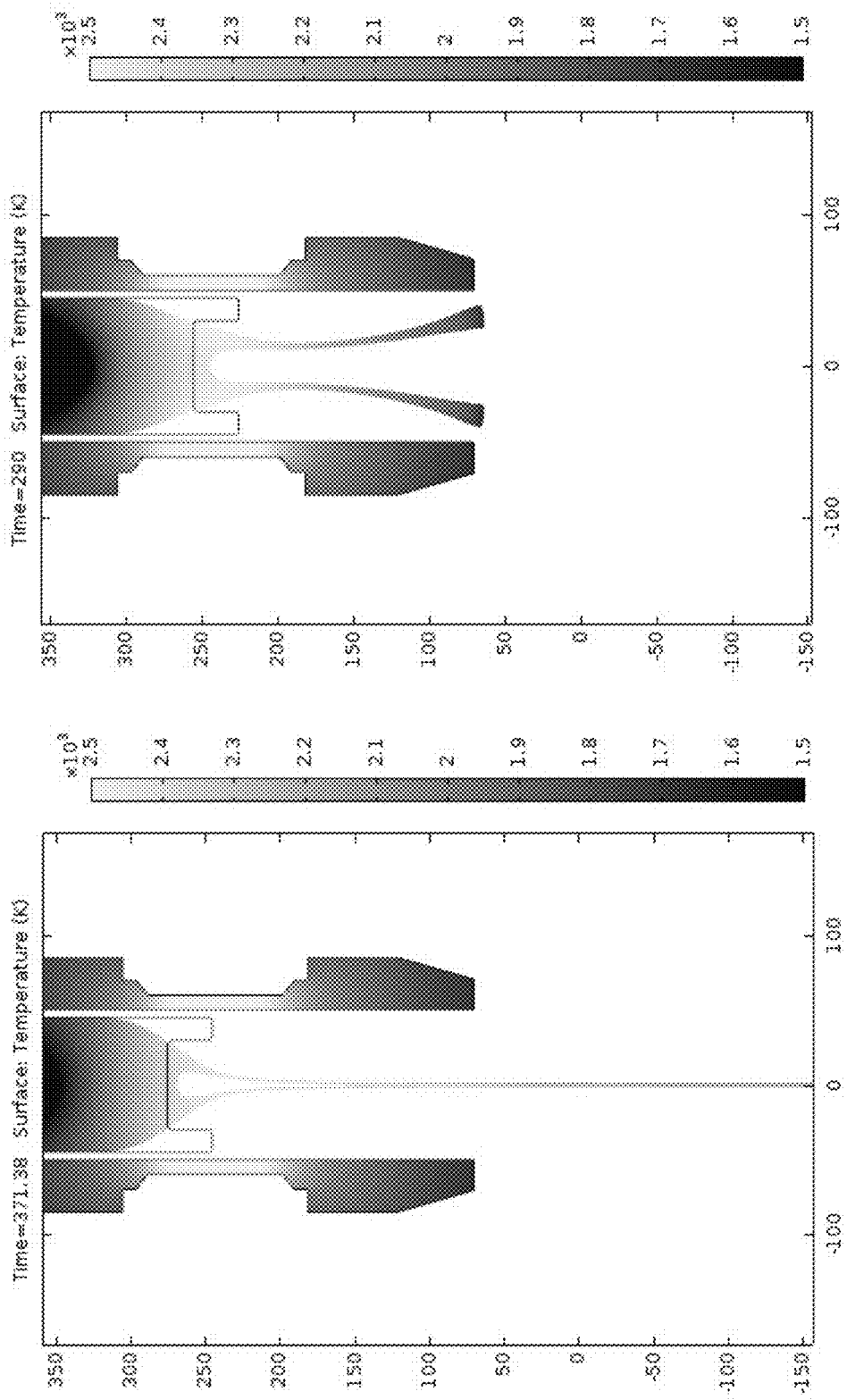

Referring to FIGS. 1A-1B, a preform 10 is provided according to exemplary embodiment. FIG. 1A is a cross-sectional view of the preform 10. FIG. 1B is a bottom view of the preform 10. The preform 10 includes a primary rod 12 and a sacrificial tip 18.

The primary rod 12 may include a cladding layer 14 surrounding a core rod 16 in a coaxial arrangement aligned along a common center line CL. The cladding layer 14 and the core rod 16 may each be made of high-purity quartz glass formed by any suitable process, such as fused quartz or one or more types of chemical vapor deposition (CVD), including inside vapor deposition, outside vapor deposition and vapor axial deposition. The core material within the core rod 16 may have a refractive index which is greater than the refractive index of the material in the surrounding cladding layer 14 to enable internal reflection of light signals passing through a fiber drawn from the preform 10, resulting in an efficient waveguide. In other embodiments, the primary rod 12 may include no cladding layers or two or more cladding layers, or may also include an uncollapsed rod-in-cylinder preform assembly with a core rod surrounded by one or more overclad tubes or cylinders. The primary rod 12 may have an essentially constant outside diameter. Although it will be understood that the primary rod 12 may have any outside diameter, in an exemplary embodiment may be up to 150 mm in some embodiments, but is not limited to this range. In other embodiments, the outside diameter of the primary rod 12 may be, for example, 60 mm to 210 mm or even larger.

In this exemplary embodiment, the sacrificial tip 18 is circular in cross section (measured perpendicular to the center line CL), and has a first end 20 attached to a bottom 22 of the primary rod 12 and a second end 24 opposite the first end 20. The sacrificial tip 18 may be attached to the primary rod by thermal welding, for example. The primary rod 12 and the sacrificial tip 18 are aligned along the common center line CL. The sacrificial tip 18 further includes a hollow region 26 which is also circular in cross section and extends fully through the sacrificial tip 18 from the first end 20 to the second end 24. To reduce the material cost of the preform 10, the sacrificial tip 14 may be made of a lower quality material than the primary rod 12. Like the primary rod 12, the sacrificial tip 18 may be formed by any suitable process, such as, but not limited to, fused quartz or one or more types of chemical vapor deposition (CVD), including inside vapor deposition, outside vapor deposition and vapor axial deposition. The sacrificial tip 18 has an outside diameter at the first end 20 which is equal to the outside diameter of the primary rod 12 at the bottom 22. In an exemplary embodiment, the sacrificial tip 18 has a constant outside diameter along its entire length equal to the outside diameter of the primary rod 12. In other words, in the exemplary embodiment, the sacrificial tip 18 is a cylinder with a constant outside diameter equal to the outside diameter of the primary rod 12. In other embodiments, the outside diameter of the sacrificial tip 18 may vary along with the length of the sacrificial tip 18. As explained below in greater detail, the inside diameter of the sacrificial tip 18 (i.e., the diameter of the hollow region 26) and the length (measured parallel to the center line CL) of the sacrificial tip 18 will vary based on the drawing conditions (e.g., the temperature distribution and dimensions of the draw furnace). In an exemplary embodiment, the optimized inside diameter ranges from approximately 50% to approximately 80% of the outside diameter of the sacrificial tip 18 and the length ranges from approximately 10 mm to approximately 60 mm, preferably 20 mm to 50 mm, and most preferably 25 mm to approximately 35 mm. The inside diameter may vary or be constant along the length of the sacrificial tip 18. For example, the sacrificial tip 18 may have a constant inside diameter. In other words, the hollow region 26 may be cylindrical. In other embodiments where the outside diameter varies, the inside diameter may also vary by the same degree, such that the sacrificial tip has a constant wall thickness (i.e., the difference between the inside diameter and the outside diameter). In the exemplary embodiment depicted in FIGS. 1A-1B, both the inside diameter and outside diameter are constant such that the sacrificial tip is a hollow cylinder with a constant outside diameter equal to the outside diameter of the primary rod 12.

By varying the dimensions of the sacrificial tip 18, the preform 10 may be used in a method which draws an optical fiber from the preform 10 while minimizing material waste and waveguide distortion. As discussed in more detail below, the inside diameter and the length of the sacrificial tip 18 are optimized such that, when heated, the sacrificial tip 18 deforms and collapses into a tapered tube that is made primarily from material from the sacrificial tip 18 and minimizes the waste of material from the primary rod 12 in the initial glass drop. The sacrificial tip 18 also balances the gravitational and viscosity-related forces acting on the primary rod 12 in a radially-uniform manner that minimizes the distortion to the cladding-to-core ratio (i.e., by balancing the forces applied to various radial locations of the primary rod 12 to reduce or eliminate differential cladding and core glass flow).

Referring to FIG. 2, the preform 10 described above may be used to form an elongated glass component by positioning the preform 10 in a furnace 30 and heating the preform 10 in the furnace 30. The furnace 30 includes a heating element 32, for example made of graphite or ceramic. The heating element 32 generates radiative heat, typically thorough electrical resistance or inductive heating, which increases the temperature of the furnace 30 and transfers thermal energy to the preform 10 through mutual radiation exchange. The available thermal energy is greatest horizontally in-line with the heating element 32, and particularly adjacent to the center 34 of the heating element 32. As the vertical distance from the center 34 increases, the available thermal energy in the furnace 30 decreases. As the preform 10 is heated, the primary rod 12 and the sacrificial tip 18 begin to soften according to the temperature, and therefore the viscosity, distribution. The sacrificial tip applies additional gravitational force to the outer part of the cladding layer 14 without pulling on the core rod 16, which balances the glass flow between the cladding layer 14 and the core rod 16. As a result, distortion to the cladding-to-core ratio is minimized and good waveguide or fiber yield is increased. Because the cladding-to-core ratio distortion is minimized, the waveguide properties of the resulting fiber, such as cutoff wavelength, mode field diameter, dispersion, and core eccentricity, are also improved. The sacrificial tip 18 also collapses to form the tapered tube at the bottom end of the preform 10 which is made essentially only material from the sacrificial tip. The formation of the tapered tube from the sacrificial tip 18 is best seen in FIGS. 3A-3E, discussed below in more detail along with Example 1. The tapered tube is then able to pull down evenly on the remaining primary rod 12 and eliminates the formation of a bulb. Because the bulb is generally not usable as an optical fiber, eliminating the need to form the bulb from the primary rod 12 to draw the fiber reduces material waste. It was also discovered that, although the addition of the sacrificial tip 18 eliminates the formation of the bulb, the sacrificial tip 18 also reduces the drip time relative to a square cut preform with no sacrificial tip, as discussed below in more detail in conjunction with Example 8.

In order to ensure maximum performance of the sacrificial tip 18 (i.e., minimize the amount of waste material from the primary rod 12 and the distortion of the cladding-to-core ratio), the positioning of the preform 10 and the way thermal energy is transferred to the preform 10 within the furnace are controlled. As explained above, because the radiative thermal energy in the furnace 30 varies with vertical position, the amount of thermal energy transferred to various parts of the preform 10 can be controlled by controlling the vertical position of the preform 10 in the furnace 30. Therefore, the viscosity of the various parts of the preform 10 can also be controlled through the resulting temperature distribution. By controlling the relative viscosities of the sacrificial tip 18 and the primary rod 12, the sacrificial tip 18 softens and begins to drip into the tapered tube before the primary rod 12 drips too much, eliminating the formation of a drawing bulb and balancing the forces applied to the core rod 16 and the cladding layer 14. If the sacrificial tip 18 drips prematurely before the primary rod 12 is softened, the weight of the sacrificial tip 18 will not be able to pull the primary rod 12 into a fiber. If the primary rod 12 softens too quickly, a drawing bulb made of the primary rod 12 will form, resulting in increased waste.

As explained in greater detail in the Examples below, the joint between the primary rod 12 and the sacrificial tip 18 is preferably located above the center 34 of the heating element 32. As a result, the sacrificial tip 18 is initially exposed to greater temperatures than the primary rod 12. This temperature differential results in the sacrificial tip 14 softening prior to the primary rod 12 softening. As explained below in Examples 6 and 7, positioning the preform 10 too high in the furnace 20 results in the primary rod 12 not softening enough to be pulled down by the sacrificial tip 18, and positioning the preform 10 too low in the furnace 20 results in the primary rod 12 softening and dripping along with the sacrificial tip 18. Each case results in wasted material of the primary rod 12 or an unacceptably long drip time. In some embodiments, the preform 10 may be lowered gradually into the furnace in order to further control heat transfer between the furnace 30 and the preform 10. Gradually lowering the preform 10 into the furnace 30 prevents thermally induced cracking at the joint between the primary rod 12 and the sacrificial tip 18. Generally, exposing the cold preform 10 to maximum oven temperature temperatures results in thermal shock which can crack the preform 10. Heat transfer may also be controlled instead of, or in addition to, gradually lowering the preform 10 into the furnace 30 by ramping the temperature of the furnace 30 while the preform 10 is in the furnace 30.

In an exemplary embodiment, the process includes initially positioning the joint between the primary rod 12 and the sacrificial tip 18 at a distance above the center 34 of the heating element 32 which is greater than the length of the heating element 32, for example approximately 120% of the length of the heating element 32, while reduced power is applied to the heating element 32. Power to the heating element 32 is then increased and the preform 10 is lowered into the furnace 30 once a desired temperature is reached inside the furnace 30, for example 2000° C. The preform may then be lowered to the optimal position in which the joint between the primary rod 12 and the sacrificial tip 18 is located above the center 34 of the heating element 32. In other embodiments, the preform 10 may first be lowered to a second position above the optimal position, held for a period of time, and then lowered the remaining distance to the optimal position. The second location may be approximately 10% of the length of the heating element 32 below the initial position, and the preform 10 may be held at the second position for approximately 4 minutes.

EXAMPLES

The following examples are included to demonstrate the effects of changes in sacrificial tip thickness (i.e., difference between the outside diameter and the inside diameter), sacrificial tip length, and positioning of the preform in the draw furnace. In each example, finite element modeling (FEM) was used to simulate a primary rod having an outer diameter of 90 mm positioned in a draw furnace having an inner diameter of 100 mm and a graphite heating element 90 mm in length. The FEM model was able to accurately simulate the key radiation exchange mechanism between the furnace and the preform to capture the preform geometry and position inside the furnace during heating. The accuracy of the FEM model was confirmed by conducting experiments with actual preforms under the same conditions used in the model and comparing the results.

Examples 1-7 detail the impact of sacrificial tip geometry and preform 10 position on the change in shape of the preform over time. In each of FIGS. 3A-9C, the original position and geometry of the preform is indicated by the white outline. The position and shape of the preform 10 at the time of each figure is indicated by the shaded outline, with the shade corresponding to the temperature of the preform 10 according to the scale provided to the right of each figure. Example 1 depicts a model of a preform with a sacrificial tip having an optimized wall thickness, length, and furnace position. Example 2 depicts a model of a preform with a sacrificial tip which has a wall which is too thin. Example 3 depicts a model of a preform with a sacrificial tip which has a wall which is too thick. Example 4 depicts a model of a preform with a sacrificial tip which is too long. Example 5 depicts a model of a preform with a sacrificial tip which is too short. Example 6 depicts a model of a preform with a sacrificial tip which is positioned too high in the furnace. Example 7 depicts a model of a preform with a sacrificial tip which is positioned too low in the furnace.

Figure 10A:
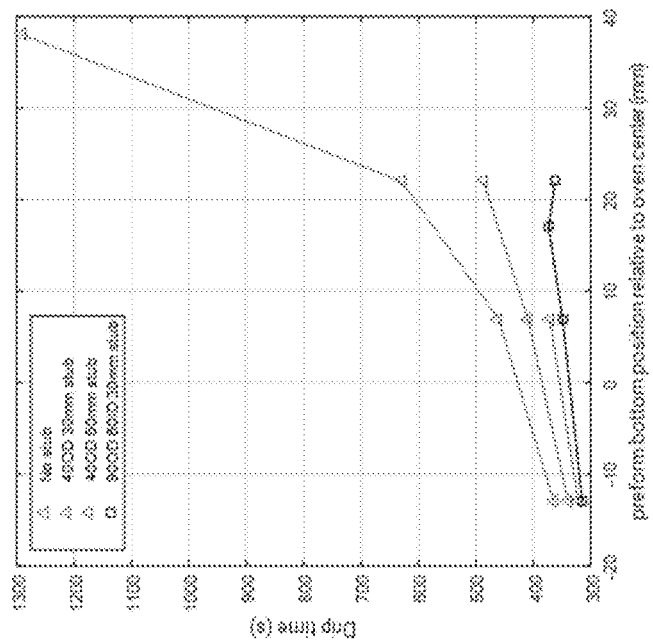
FIGS. 10A and 10B are graphs depicting the drawing bulb weight and drip time for various preform configurations.
Figure 10B:
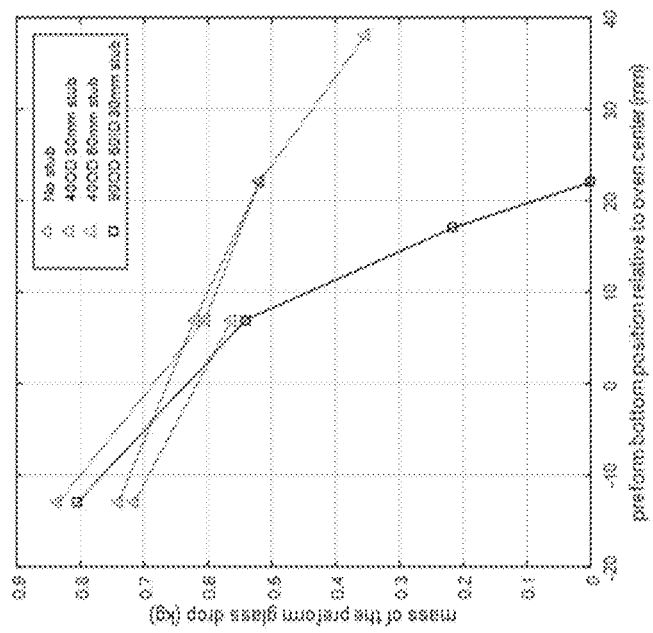

Example 8, described in conjunction with FIGS. 10A and 10B, details the impact of the sacrificial tip on the glass drop waste of the drawing bulb at the bottom of the preform and the drip time of the preform.

Example 9, described in conjunction with FIGS. 11A-11C and 12A-12C, details the impact of the sacrificial tip on the cladding-to-core ratio of the resulting drawn glass strand in the glass drip.

Example 10, described in conjunction with FIGS. 13A-13C, 14A-14C, and 15A-15C, details the impact on the position of the preform within the furnace on the cladding-to-core ratio of the resulting drawn glass strand in the glass drip.

Example 1

In Example 1, the model includes a hollow cylindrical sacrificial tip having an outside diameter of 90 mm (i.e., equal to the outside diameter of the primary rod), an inside diameter of 60 mm, and a length of 30 mm. The thickness (i.e., the difference between the outside diameter and the inside diameter) of the sacrificial tip is 15 mm. The preform is positioned in the draw furnace with the joint between the sacrificial tip and the primary rod positioned 22 mm above the center of the furnace. As can be seen from FIGS. 3A-3E, the sacrificial tip begins to drip so that it drags the preform bottom to form a narrow tip which consists almost entirely of material from the sacrificial tip. As a result, essentially no material of the primary rod (i.e., the higher quality preform material) is wasted to form a drawing bulb.

Example 2

In Example 2, the model of Example 1 was repeated with the sacrificial tip inside diameter increased to 70 mm, thereby reducing the sacrificial tip wall thickness to 10 mm. The remaining dimensions were kept constant from Example 1. As can be seen from FIGS. 4A-4C, the reduced wall thickness results in a sacrificial tip that is too thin to drag a sufficient bottom area of the primary rod to draw a fiber. Accordingly, the tapered tube takes longer to develop and includes more material from the primary rod, resulting in material waste.

Example 3

In Example 3, the model of Example 1 was repeated with the sacrificial tip inside diameter reduced to 30 mm, thereby increasing the sacrificial tip wall thickness to 30 mm. The remaining dimensions were kept constant from Example 1. As can be seen from FIGS. 5A-5D, when the sacrificial tip wall is too thick, the increased weight results in too much material from the primary rod being pulled into the drawing bulb, resulting in material waste. However, the waste is less than in Example 2 where the sacrificial tip wall is too thin. This suggests that there is greater tolerance toward thicker sacrificial tip walls.

Example 4

In Example 4, the model of Example 1 was repeated with the sacrificial tip length reduced to 20 mm. The remaining dimensions were kept constant from Example 1. As can be seen from FIGS. 6A-6C, when the sacrificial tip is too short, the weight of the sacrificial tip is not sufficient to drag the bottom of the primary rod downward before the primary rod begins to drip by itself. As a result, a thicker than desired preform bottom drip develops and material is wasted.

Example 5

In Example 5, the model of Example 1 was repeated with the sacrificial tip length increased to 40 mm. The remaining dimensions were kept constant from Example 1. As can be seen from FIGS. 7A-7C, when the sacrificial tip is too long, the weight makes the sacrificial tip drip easier and faster, and does not last long enough to drag the bottom of the primary rod downward. Instead, the sacrificial tip forms a very thin tube, and a drawing bulb forms from material from the primary rod, as if they sacrificial tip were not attached.

Example 6

In Example 5, the model of Example 1 was repeated with the joint between the sacrificial tip and the primary rod moved up to 32 mm above the center of the furnace. The remaining dimensions were kept constant from Example 1. As can be seen from FIGS. 8A-8C, when the preform is positioned too high in the furnace, the sacrificial tip is heated more than the primary rod, and the sacrificial tip drips and forms a thin tube before the primary rod is sufficiently softened by the heat of the furnace to be drawn by the weight of the drip. A drawing bulb will instead form at the bottom of the primary rod once it is sufficiently hot, resulting a waste of material.

Example 7

In Example 5, the model of Example 1 was repeated with the joint between the sacrificial tip and the primary rod moved down to 12 mm above the center of the furnace. The remaining dimensions were kept constant from Example 1. As can be seen from FIGS. 9A-9C, when the preform is positioned too low in the furnace, the primary rod is softened by the heat of the furnace prematurely and too much material from primary drips along with the sacrificial tip, resulting in wasted material.

Example 8

In Example 10, four different preforms were tested to determine the effect of a sacrificial tip on drawing bulb mass and drip time. The four preforms were a 90 mm primary rod with no sacrificial tip, a 90 mm primary rod with a solid 30 mm with an outside diameter of 40 mm, a 90 mm primary rod with a solid 60 mm stub with an outside diameter of 60 mm, and a 90 mm primary rod with a hollow cylindrical sacrificial tip with a length of 30 mm, an outside diameter of 90 mm, and an inside diameter of 60 mm. Each preform was tested with the preform bottom at various heats relative to the center of the heating element. As can be seen from FIG. 10A, as the preform bottom is moved up in the furnace, the mass of the drawing bulb decreases. In the case of the hollow cylinder sacrificial tip, the mass of the preform glass drop is goes to essentially zero as the preform bottom is moved at least 20 cm above the center of the furnace, indicating essentially no material waste. Furthermore, despite the reduced mass of the drawing bulb, the preform with the hollow cylinder sacrificial tip also demonstrated substantially reduced drip times, indicating a faster and more efficient draw process.

Example 9

Figures 11A, 11B, 11C:
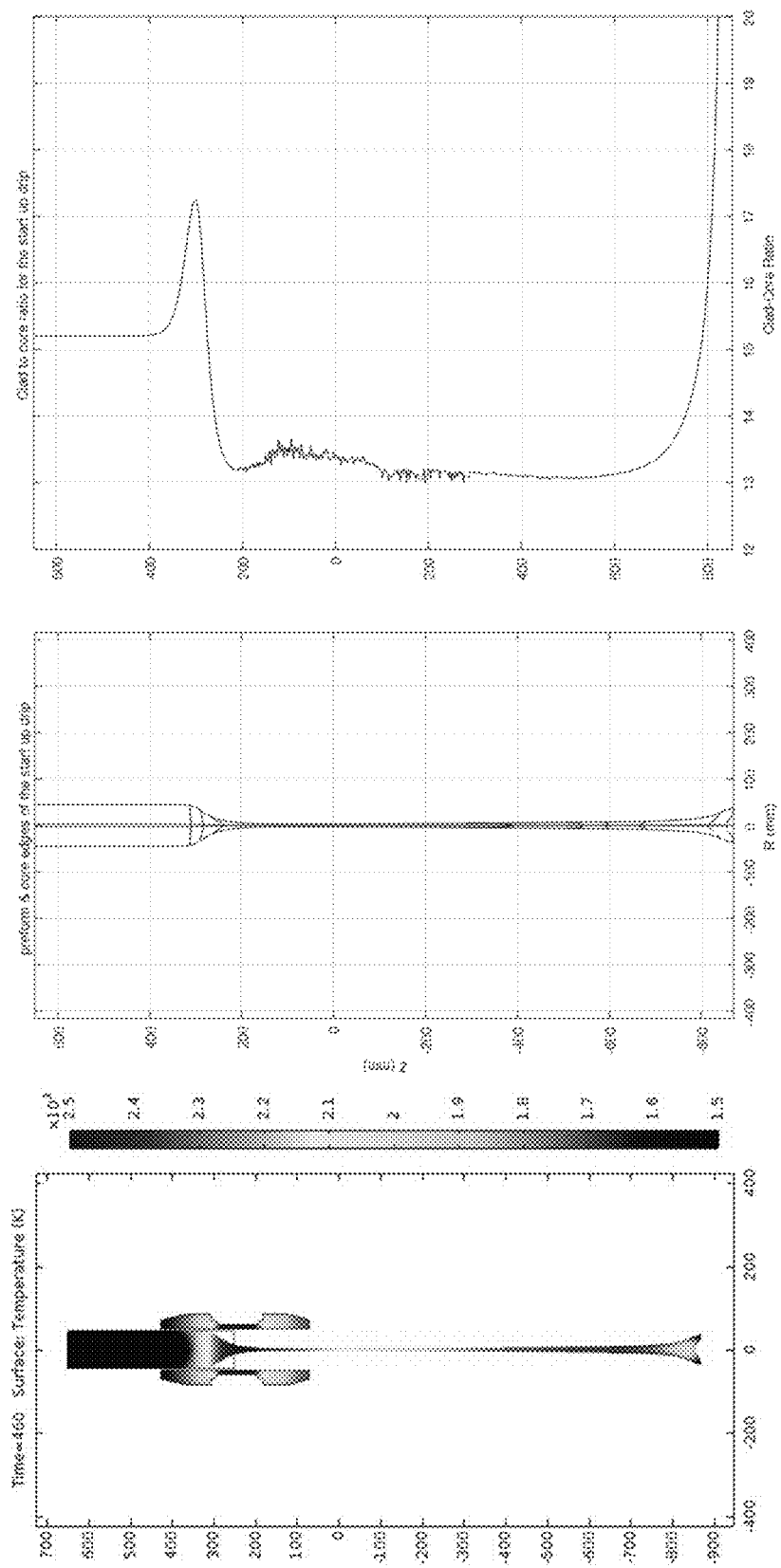
FIGS. 11A-11C depict the position, geometry, temperature, and cladding-to-core ratio of a preform with no sacrificial tip after a tapered tube has formed at the bottom of the preform.

In Example 9, the impact of the sacrificial tip on the cladding-to-core ratio of the resulting drawn fiber was measured by comparing a 90 mm preform with no sacrificial tip (FIGS. 11A-11C) to a 90 mm preform with a hollow cylindrical sacrificial tip with a length of 30 mm, an outside diameter of 90 mm, and an inside diameter of 60 mm (FIGS. 12A-12C). FIGS. 11A and 12A depict the position, geometry, and temperature of the respective preforms after a tapered tube has formed at the bottom of the preform. FIGS. 11B and 12B depict the respective preforms at the intersection of the tapered tube and the preform body, specifically detailing the presence of the core rod within the preform. FIGS. 11C and 12C depict the cladding-to-core ratio along the length of the preform. As can be seen from FIGS. 11A-11C, without the sacrificial tip, the core rod is pulled down into a drawing bulb, resulting in large variations in cladding-to-core ratio. Such a distorted cladding-to-core ratio results in unusable fiber and the draw must continue until the cladding-to-core ratio stabilizes, resulting in material waste. In comparison, as can be seen from FIGS. 12A-12C, the addition of the hollow cylinder sacrificial tip forms a thin, tapered tube that includes essentially no material of the core rod and reduces the cladding-to-core ratio distortion in the neckdown and drip compared to the preform with no sacrificial tip.

Example 10

Figures 13A, 13B, 13C:
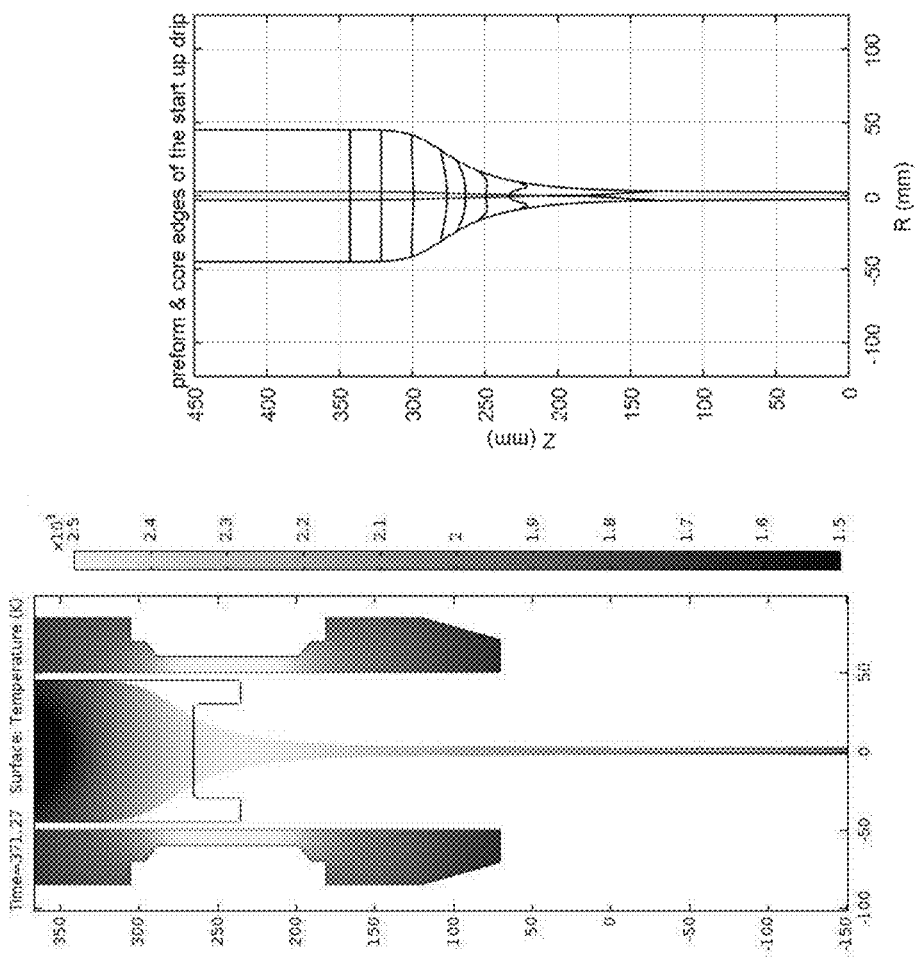
FIGS. 13A-13C; depict the position, geometry, temperature, and cladding-to-core ratio of a preform with a sacrificial tip positioned at an optimized location after a tapered tube has formed at the bottom of the preform.
Figures 15A, 15B, 15C:
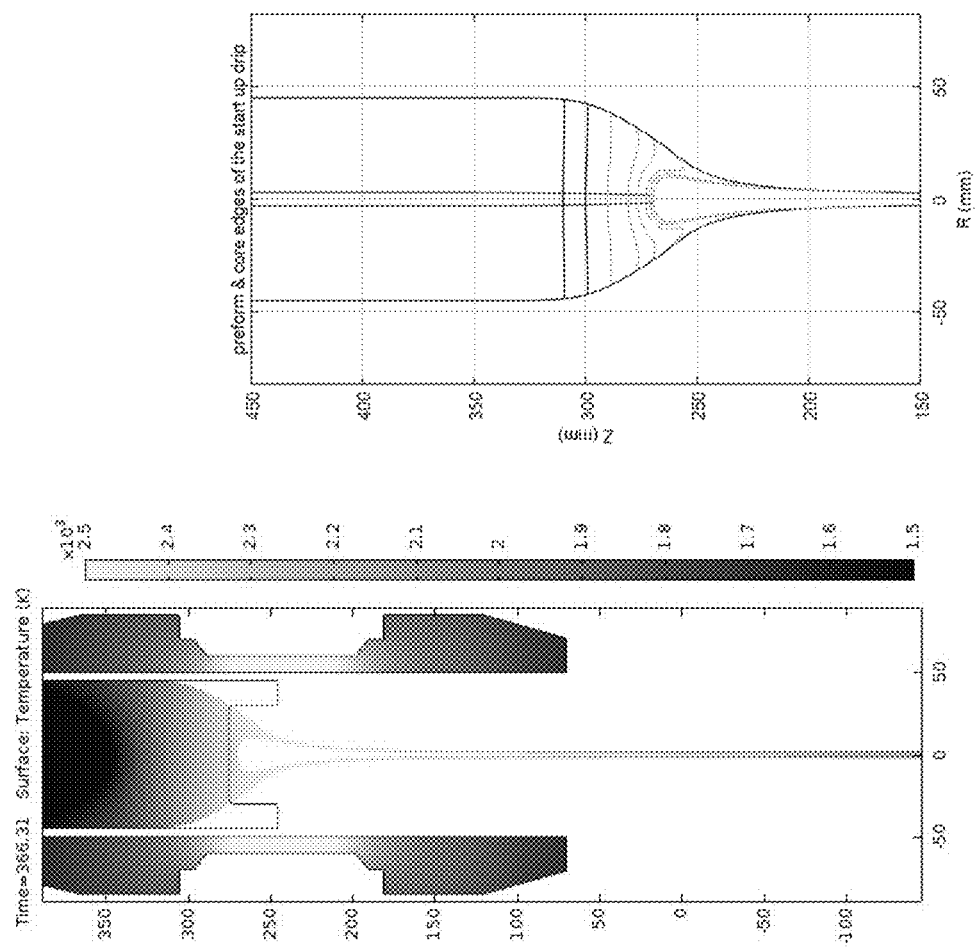
FIGS. 15A-15C depict the position, geometry, temperature, and cladding-to-core ratio of a preform with a sacrificial tip positioned above an optimized location after a tapered tube has formed at the bottom of the preform.

In Example 10, the impact on the position of the preform within the furnace on the cladding-to-core ratio of the resulting drawn fiber was measured by comparing the result of a 90 mm preform with a hollow cylinder sacrificial tip with a length of 30 mm, an outside diameter of 90 mm, and an inside diameter of 60 mm at various furnace positions, specifically at an optimized position (FIGS. 13A-13C), 10 mm below the optimized position (FIGS. 14A-14C), and 10 mm above the optimized position (FIGS. 15A-15C). FIGS. 13A, 14A, and 15A depict the position, geometry, and temperature of the respective preforms after a tapered tube has formed at the bottom of the preform. FIGS. 13B, 14B, and 15B depict the respective preforms at the intersection of the tapered tube and the preform body, specifically detailing the presence of the core rod within the preform. FIGS. 13C, 14C, and 15C depict the cladding-to-core ratio along the length of the preform. As shown in FIGS. 13A-13C, when the preform with sacrificial tip is positioned at the optimized location, the preform bottom forms a tip with minimum glass waste, and a minimum portion of glass with an altered cladding-to-core ratio. As shown in FIGS. 14A-14C, when the preform is positioned too low, the drip from the sacrificial tip is much shorter and a drip of preform glass also forms. Material from the core rod can be observed in the drip, resulting in significant distortion to the cladding-to-core ratio. As shown in FIGS. 15A-15C, when the preform is positioned too high, a thin, hollow tube forms at the bottom of the preform which includes material from the cladding layer. Because of the dripping of the cladding glass, the cladding-to-core ratio is significantly distorted.

Although illustrated and described above with respect to certain specific embodiments and examples, the disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader range. In addition, features of one embodiment may be incorporated into another embodiment.

What is claimed:

1. A method of forming an optical glass component, the method comprising:
   positioning a glass preform in a furnace, wherein the glass preform comprises:
      an unelongated primary rod having a constant outside diameter and a flat bottom portion, wherein the unelongated primary rod comprises a core rod surrounded by at least one outer cladding layer; and
      a cylindrical sacrificial tip having a first end attached to the flat bottom portion of the unelongated primary rod, a second end opposite the first end, and a hollow interior region extending fully from the first end to the second end,
      wherein the sacrificial tip is circular in cross section and has a constant inside diameter and outside diameter along its entire length from the first end to the second end, and wherein the constant outside diameter is equal to the outside diameter of the unelongated primary rod; and
   heating the glass preform in the furnace to soften the sacrificial tip, whereby a drip forms at a bottom end of the preform and the drip pulls down on and elongates the unelongated primary rod to form an elongated primary rod.

2. The method of claim 1, wherein the unelongated primary rod and the sacrificial tip are both made of quartz glass, and the quartz glass of the unelongated primary rod is of higher quality than the quartz glass of the sacrificial tip.

3. The method of claim 1, wherein the sacrificial tip is welded to the unelongated primary rod.

4. The method of claim 1, wherein the elongated primary rod has a cladding-to-core ratio which is the same as the cladding-to-core ratio of the unelongated primary rod.

5. The method of claim 1, wherein the hollow interior region has an inside diameter ranging from approximately 50% to approximately 80% of the outside diameter of the sacrificial tip.

6. The method of claim 1, wherein the sacrificial tip has a length of approximately 10 mm to approximately 60 mm.

7. The method of claim 6, wherein the sacrificial tip has a length of approximately 20 mm to approximately 50 mm.

8. The method of claim 7, wherein the sacrificial tip has a length of approximately 25 mm to approximately 35 mm.

9. The method of claim 1, further comprising preheating the glass preform at a height above the center of the furnace prior to positioning the glass preform in the furnace at an optimized location within the furnace.

10. The method of claim 9, wherein preheating the glass preform comprises:
    heating the furnace at a low power;
    positioning the glass preform at a first location above the center of the furnace at low power for a first period of time;
    raising the power of the furnace to a higher operating power of the furnace; and
    lowering the preform into the furnace to an optimized hanging location above the center of the furnace.

11. The method of claim 10, wherein lowering the preform into the furnace to the optimized hanging location comprises:
    lowering the preform into the furnace from the first location to a second location above the optimized hanging location;
    holding the preform at the second location for a period of time; and
    lowering the preform into the furnace from the second location to the optimized hanging location.

12. The method of claim 1, wherein the drip formed at a bottom end of the preform includes only material from the sacrificial tip and not material from the unelongated primary rod.

13. The method of claim 12, wherein the unelongated primary rod includes an un-collapsed rod-in-cylinder preform assembly with a core rod surrounded by one or more overclad cylinders.

14. The method of claim 1, wherein the drip pulling down on and elongating the unelongated primary rod comprises pulling on an outside portion of the at least one outer cladding layer without pulling on the core rod.

* * * * *